(12) United States Patent
Harris et al.

(10) Patent No.: US 11,897,701 B2
(45) Date of Patent: Feb. 13, 2024

(54) AUTOMATED PACKING SYSTEM

(71) Applicant: Staples, Inc., Framingham, MA (US)

(72) Inventors: Calem Harris, Tampa, FL (US);
Sebastian Mora, Davenport, FL (US);
Grant Tucker, Orlando, FL (US);
Arun Kumar Ranganathan Jagannathan, Shrewsbury, MA (US);
Carl Skantze, Tampa, FL (US); Arnold Tsoka, Orlando, FL (US); Mario Faulkner, Wesley Chapel, FL (US)

(73) Assignee: Staples, Inc., Framingham, MA (US)

( * ) Notice: Subject to any disclaimer, the term of this patent is extended or adjusted under 35 U.S.C. 154(b) by 0 days.

(21) Appl. No.: 17/810,269

(22) Filed: Jun. 30, 2022

(65) Prior Publication Data

US 2023/0348202 A1    Nov. 2, 2023

Related U.S. Application Data

(63) Continuation-in-part of application No. 17/661,702, filed on May 2, 2022.

(51) Int. Cl.
*B65G 47/46* (2006.01)
*B65B 5/06* (2006.01)
(Continued)

(52) U.S. Cl.
CPC ............... *B65G 47/46* (2013.01); *B65B 5/06* (2013.01); *B65B 35/24* (2013.01); *B65B 65/003* (2013.01); *B65G 47/44* (2013.01); *B65G 47/8823* (2013.01)

(58) Field of Classification Search
CPC ................................. B65G 47/44; B65G 47/46
(Continued)

(56) References Cited

U.S. PATENT DOCUMENTS 3,071,239 A    1/1963   Burtness
4,058,199 A *  11/1977  Schlagel ............... B65G 47/78
                                                    198/359

(Continued)

FOREIGN PATENT DOCUMENTS

AU   2009238310 A1 *  6/2010   ........... B65D 90/587
CN   212103473 U  *  12/2020
CN   112024419 B  *  4/2022   ............. B07C 3/008

OTHER PUBLICATIONS

Zhang; Hongqing "Crossed Belt Type Sorting System and Sorting System" (English Translation), Dec. 4, 2020, worldwide.epacenet.com (Year: 2020).*

(Continued)

*Primary Examiner* — Michael McCullough
*Assistant Examiner* — Molly K Devine
(74) *Attorney, Agent, or Firm* — VLP Law Group LLP; Michel Bohn

(57) ABSTRACT

An automated packing system, which may include a transfer station is described. In an example implementation, system may include an item-consolidation area that receives items, a carton receiving area that receives a carton, and a structure that holds the item-consolidation area vertically higher than the carton-receiving area. The system may also include a passage between the item-consolidation area and the carton-receiving area. The passage that may allow the items to pass from the item-consolidation area and the carton in the carton-receiving area. The system may include an actuation mechanism that controls movement of the items between the item-consolidation area and the carton-receiving area.

20 Claims, 22 Drawing Sheets

(51) Int. Cl.
*B65B 35/24* (2006.01)
*B65B 65/00* (2006.01)
*B65G 47/44* (2006.01)
*B65G 47/88* (2006.01)

(58) Field of Classification Search
USPC .................................................. 198/359, 532
See application file for complete search history.

(56) References Cited

U.S. PATENT DOCUMENTS

| | | |
|---|---|---|
| 6,460,681 B1 | 10/2002 | Coutant et al. |
| 6,688,459 B1 | 2/2004 | Bonham et al. |
| 6,695,135 B1 | 2/2004 | Lapeyre |
| 7,650,985 B2 * | 1/2010 | Day ..................... B65G 11/206 |
| | | 198/532 |
| 9,192,965 B2 | 11/2015 | Serjeantson et al. |
| 10,646,991 B2 | 5/2020 | Wagner et al. |
| 10,981,732 B2 | 4/2021 | Eisenberg et al. |
| 11,208,272 B2 * | 12/2021 | Battles ................... G06Q 50/28 |
| 2020/0024014 A1 * | 1/2020 | Warmulla ................. B65B 5/06 |

OTHER PUBLICATIONS

Xu; Qiang, "Automatic opening and closing door discharging device" (English Translation), Dec. 8, 2020, worldwide.epacenet.com (Year: 2020).*

* cited by examiner

AUTOMATED PACKING SYSTEM

BACKGROUND

This application relates to warehouse fulfillment systems. For example, this application relates to a transfer station that transfers objects from a first location into a second location, for example, into a carton, which may be used to automatedly package the cartons.

Some current fulfillment systems use drag-along carts onto which items are placed by pickers. The pickers may place the items into shipping cartons to be shipped to customers. Other fulfillment systems may use robots to bring items to pickers, who then manually place the items into shipping cartons. Some fulfillment systems divide inventory into a series of zones and use carts, robots, or conveyor belts to move items between zones, but many of the operations are performed manually. Such manual processes require human pickers to follow many instructions, which leads to significant errors by the human pickers and fatigue.

Current fulfillment systems require the human pickers to take an item from a shelving unit and place the item into a carton for packaging. Such manual processes are very slow, require items to be placed individually, must be performed sequentially for a carton, and are rife with opportunities for human error.

SUMMARY

An automated packing system can be configured to perform particular operations or actions by virtue of having software, firmware, hardware, or a combination of them installed on the system that in operation causes or cause the system to perform the actions. One general aspect of the system includes an item-consolidation area that receives one or more items; a carton-receiving area that receives a carton; a structure that holds the item-consolidation area vertically higher than the carton-receiving area; a passage between the item-consolidation area and the carton-receiving area, the passage that allows the one or more items to pass from the item-consolidation area to the carton in the carton-receiving area; and an actuation mechanism that controls movement of the one or more items between the item-consolidation area and the carton-receiving area.

Implementations of the system may include one or more of the following features. The system further including: that the item-consolidation area includes one or more walls that prevent items from falling horizontally out of the item-consolidation area, the passage is located at a bottom of the item-consolidation area, and the structure includes a frame that holds the item-consolidation area vertically above the carton-receiving area so that gravity causes items to fall through the passage and into the carton in the carton-receiving area; a chute including one or more sloped surfaces that guide the one or more items toward the passage in the item-consolidation area; and that the passage is offset from a center of the item-consolidation area toward a corner of the item-consolidation area; that the carton-receiving area includes a guide positioning the carton at a location of the carton-receiving area that is offset from a center of the carton-receiving area toward a corner of the carton-receiving area, the corner of the carton-receiving area corresponding to the corner of the item-consolidation area; and that the passage includes an aperture in a floor item-consolidation area, the aperture providing an opening between the item-consolidation area and the carton-receiving area.

Implementations of the system may include one or more of the following features. That the actuation mechanism includes two or more door members closing the passage when in a closed position and opening the passage when in an open position; that the two or more door members pivot downward toward the carton-receiving area when in the open position, the two or more door members pivoting away from each other when in the open position; that each of the two or more door members include a side wall adapted to guide the one or more items into the carton in the carton-receiving area when the two or more door members are in the open position and the one or more items are moving between the item-consolidation area and the carton in the carton-receiving area.

Implementations of the system may include one or more of the following features. That the actuation mechanism includes one or more door members closing the passage when in a closed position and opening the passage when in an open position and a motor connected to the one or more door members to open or close the one or more door members responsive to a signal from a processor; the actuation mechanism includes one or more bars that provide vertical support to the one or more door members when in the closed position, the one or more bars moving to remove vertical support from the one or more door members when in the open position; that the one or more bars move horizontally when transitioning between the open position and the closed position; that the one or more door members include a first door member and a second door member, the one or more bars include a first bar and a second bar, the first bar providing support to the first door member when in the closed position, the second bar providing support to the second door member when in the closed position, and one or more cables linking movement of the first bar with movement of the second bar; that the actuation mechanism includes one or more pullies coupled with the one or more cables and configured to move the second bar away from the first bar when the motor moves the first bar into the open position; and that the one or more bars are coupled with one or more cams to provide vertical support to the one or more door members when in the closed position, the one or more cams contacting the one or more door members at varying points of the one or more cams when the one or more cams move between the closed position and the open position.

Implementations of the system may include one or more of the following features. That the actuation mechanism includes a door member closing the passage when in a closed position and opening the passage when in an open position, the door member pivoting downward toward the carton-receiving area when opening to the open position, and a cam including a contoured side that contacts the door member at varying points as the door member pivots between the open position and the closed position, the cam providing support to keep the door member in the closed position; a first conveyor belt positioned adjacent to the item-consolidation area, the first conveyor belt transporting the one or more items to the item-consolidation area; and a second conveyor belt positioned adjacent to the carton-receiving area, the carton-receiving area transporting the carton to the carton-receiving area.

Another general aspect includes a method including: transferring one or more items into an item-consolidation area of a transfer station; transmitting a first actuation signal to an actuation mechanism of the transfer station to actuate into an open position, the actuation mechanism controlling movement of the one or more items from the item-consolidation area to a carton-receiving area of the transfer station, the carton-receiving area holding a carton, the open position allowing the one or more items to move from the item-consolidation area to the carton-receiving area; receiving a confirmation message indicating that the one or more items have been transferred from the item-consolidation area to the carton-receiving area; and transmitting a second actuation signal to the actuation mechanism to actuate into a closed position.

Implementations of the operations may include one or more of the following features. The method comprising determining a carton size for the carton; transferring the carton having the determined carton size into the carton-receiving area of the transfer station; and based on the confirmation message indicating that the one or more items have been transferred from the item-consolidation area to the carton-receiving area, transferring the carton out of the carton-receiving area of the transfer station.

Other implementations of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

Figure 1:
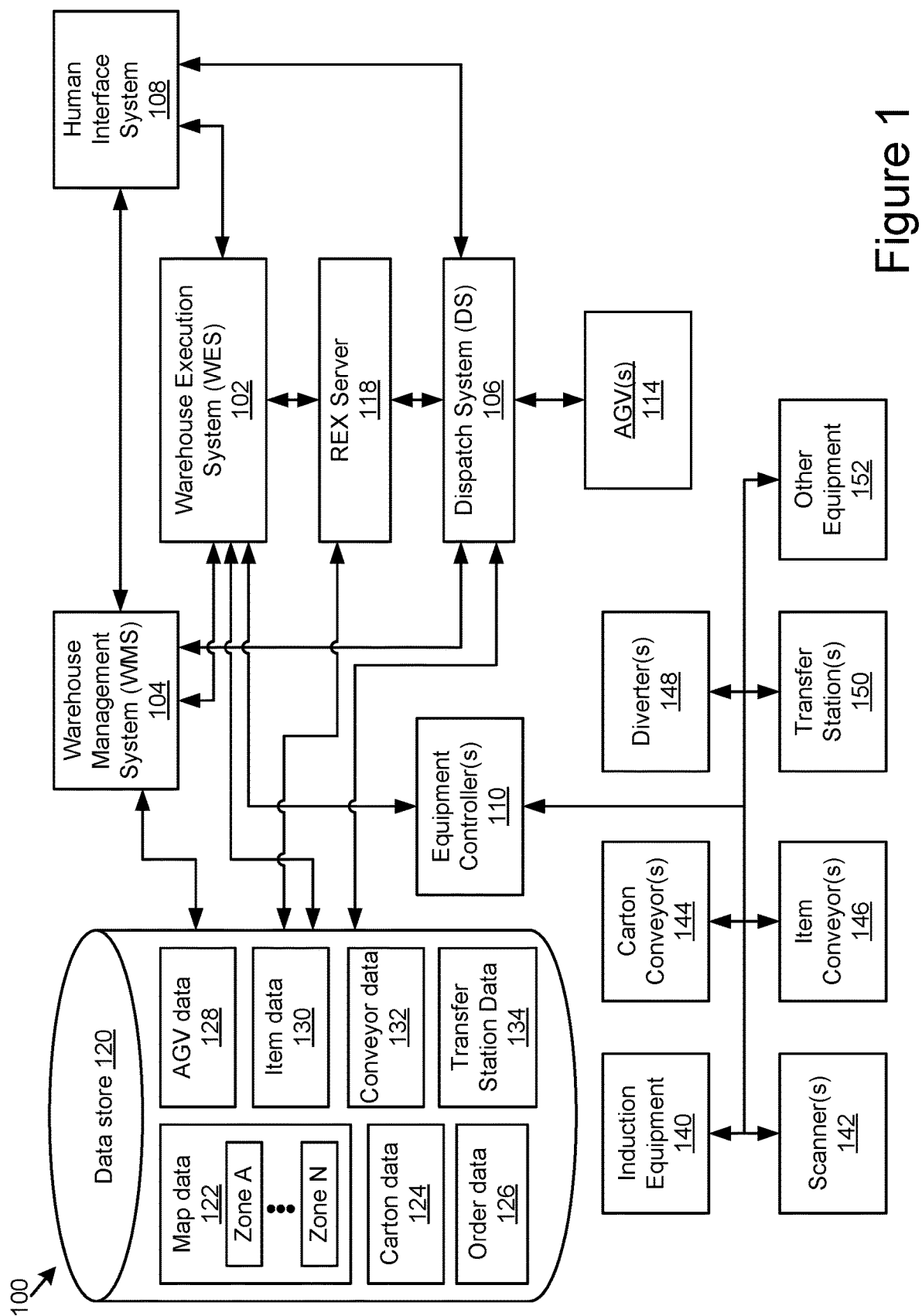
FIG. 1 depicts an example system and data communication flow for implementing an automated packing system.

The technology described herein relates to an automated sorting and/or packing system comprising various software and hardware devices. The technology may include beneficial configurations, operations, features, and interactions. Among other benefits, the technology described herein improves upon that described in the Background Section. For instance, the technology provides robotic devices, systems, methods, and other aspects that can more efficiently process goods (e.g., items or items in a distribution facility).

Implementations of the technology include a transfer station 150 that may include an item-consolidation area 426, a carton-receiving area 422, an actuation mechanism, and a controller that controls actuation of the actuation mechanism. The item-consolidation area 426 may include walls, chutes, sensor, diverters, or other devices that receive an item/object (e.g., a product being fulfilled at a fulfillment center). For example, multiple items may be consolidated and held in the item-consolidation area 426 until an actuation mechanism transfers the items out of the item-consolidation area 426. The carton-receiving area 422 may receive a carton or container (e.g., a shipping box, tote, etc.) into which the actuation mechanism may transfer the item(s) from the item-receiving area. For example, the carton-receiving area 422 may include rollers, guide walls, sensors, chutes, diverters, or other mechanisms for receiving, aligning, and/or holding a carton while items are transferred into the carton. The actuation mechanism may be various mechanisms for transferring the items from the item-consolidation area 426 into a carton in the carton-receiving area 422. For example, the actuation mechanism may include a passage 434 from between the item-consolidation area 426 and the carton-receiving area 422, a door closing the passage 434, and a motor or other mechanism for opening or closing the door.

In some implementations, the transfer station 150 automatically packs items received into shipping cartons. For example, the transfer station 150 may be used with a unit sorter with various conveyors, computing devices, sensors, and other mechanisms to sort and pack items in a fulfillment center.

In some implementations, the technology may include a unit sorter that sorts individual items into their respective orders. For example, an operator or robotic device may place an item onto a sorter and a control system may direct the sorter to convey the item through a scanner that scans identifying traits of the item. A scanner of the sorter may communicate the item-identifying information to the control system, which identifies an order to which the identifying information belongs. The control system may drive the item forward until it arrives at an assigned location associated with the order in the sorter. The control system may actuate a diverter mechanism that pushes the item into the assigned location, such as an item loading area of a transfer station 150. In some instances, when the sorter has sorted the items associated with the order to an assigned transfer station 150, it may move the item(s) to a secondary location. For instance, the control system may open an item consolidation tray/area and drop the items into a shipping carton for the order. The sorter may then actuate a motor to divert the shipping carton onto a take-away conveyor line where the carton may be scanned, and a corresponding shipping label be applied to the carton in association with the order. It should be noted that these operations are provided as an illustrative example and many other operations and features are within the scope of the present disclosure.

The technology may allow the automated sorting and packing system to induct cartons in association with determined orders and transfer items directly into the cartons. For instance, as the control system scans SKUs (stock keeping units, which may identify individual physical items) for a given order, it may control the interaction between various software and hardware systems to coordinate operations. For example, the control system may determine a size of carton, box, or other container that pertains to a specific order, which the system may induct in parallel with a scanned item and, depending on the implementation, transfer the item directly into the carton.

The technology may also include mechanisms for transferring items directly into shipping cartons or other containers. For instance, the technology may transfer items into a consolidation area 426 of a transfer station 150, identify a point at which to transfer the items, and transfer the items into a container. For example, the technology may include mechanisms for transferring the items directly into one or varying sizes of cartons in the transfer stations 150. Example implementations of the transfer stations 150 and associated features, mechanisms, and features are described in further detail below.

With reference to the figures, reference numbers may be used to refer to components found in any of the figures, regardless of whether those reference numbers are shown in the figure being described. Although the same reference number may be used in multiple figures, the provided features are examples and other configurations and implementations are contemplated. Further, where a reference number includes a letter referring to one of multiple similar components (e.g., component 000a, 000b, and 000n), the reference number may be used without the letter to refer to one or all of the similar components.

FIG. 1 depicts an example system 100 and data communication flow for implementing an automated sorting and packing system. The system 100 includes a warehouse execution system (WES) 102. The WES 102 is coupled to equipment 110, a warehouse management system (WMS) 104, a data store 120 storing various data, a human interface system 108 (e.g., pick-to-voice, pick-to-light, graphical user interface(s), etc.), a robot execution server (REX) 118, a dispatch system 106, and other systems. For instance, the system 100 may include induction equipment 140, scanner(s) 142, carton conveyor(s) 144, item conveyor(s) 146, diverter(s) 148, transfer station(s) 150, and other equipment 152.

The WES 102 may, in some implementations, include one or more hardware and/or virtual servers programmed to perform the operations, acts, and/or functionality described herein. The components of the WES 102 may comprise software routines storable in one or more non-transitory memory devices and executable by one or more computer processors of the WES 102 to carry out the operations, acts, and/or functionality described herein. In further implementations, these routines, or a portion thereof, may be embodied in electrical hardware that is operable to carry out the operations, acts, and/or functionality described herein.

For example, the WES 102 may be communicatively coupled with scanner(s) 142, carton conveyor(s) 144, item conveyor(s) 146, diverter(s) 148, transfer station(s) 150, and/or other equipment 152 either directly or via the equipment controller(s) 110, which may be programmable logic controllers (e.g., conveyor controllers, conveyor scanner controllers, automated induction equipment controllers, other warehouse equipment controllers, or other computing devices for controlling equipment).

In some implementations, the WES 102 may receive, process, and transmit data to control software and hardware interactions, for example, by consolidating and controlling information across systems, as described herein. For instance, the WES 102 may serve as a decision point or control software that processes data streams for transfer station 150 allocation and use, item sorting, box induction, and other computations, as noted herein. For example, the WES 102 may communicate with equipment controller(s) 110 and/or other systems to induct a box, apply a tracking label (e.g., the identification code or license plate number described herein) to the box, and convey the box to an assigned location. The WES 102 may divert items and/or boxes into transfer stations 150, initiate the transfer of items into the boxes, and/or control finalizing of the cartons and order, among other operations described herein. One or more of these operations may be performed via communication with various equipment of the system 100, as described in further detail herein. Accordingly, the WES 102 may provide unified communication that coordinates various systems.

The WES 102 may communicate with various other systems and devices to perform its operations, as described herein, such as equipment controller(s) 110, induction equipment 140, scanner(s) 142, carton conveyor(s) 144, item conveyor(s) 146, diverter(s) 148, transfer station(s) 150, and other equipment 152. Induction equipment 140 may include an induction station (e.g., where items are placed on an item conveyor 146, such as an induction belt), box erectors, label applicators, scanners 142, picking equipment, or other devices for inducting items or cartons into the sorting system. Scanners 142 may include optical, radio, or other scanners or sensors that scan items or cartons to identify items, cartons, or other objects (e.g., their identities, presence, movement, etc.). Carton conveyors 144 may include one or more conveyors, such as conveyor belts or other devices that convey objects, such as shipping cartons, for example, between a carton induction point, transfer station 150, and/or end points (e.g., finalizing). Item conveyors 146 may include one or more conveyors, such as conveyor belts or other devices that convey objects, such as items or products, for example, between an item induction point, scan tunnel 250, transfer station 150, and/or end points (e.g., finalizing, item jackpot, etc.). While the carton conveyors 144 and item conveyors 146 may be different conveyors and/or types of conveyors, in some implementations, they may be the same conveyors and/or conveyor types. Diverters 148 may be divert arms, diverter mechanisms, such as those described herein, pneumatic mechanisms, or other devices for diverting items and/or cartons for moving the items or cartons, for example, from conveyors into transfer stations 150. Transfer stations 150 may be devices for transferring items into cartons, for example, for example, transfer stations 150 may be located adjacent to item and/or carton conveyors 144. Other equipment 152 may include various other devices, such as label applicators, carton-closing equipment, control systems, printers, actuators, motors, etc. The devices 140-152 are described in further detail throughout this disclosure.

The REX 118 may, in some implementations, include one or more hardware and/or virtual servers programmed to perform operations, acts, and/or functionality described herein. The REX 118 may generate a schedule that defines the route for an AGV 114 during a picking session. For a given AGV 114, depending on the items (e.g., identified by stock keeping units or SKUs) to be placed in the cartons of a cart, the REX 118 may generate an AGV 114 schedule and transmit it to the dispatch system 106, which in turn deploys an AGV 114 according to the schedule, for instance. In some implementations, the dispatch system 106 instructs the AGV 114 to proceed through one or more of the zones of the distribution facility according to the schedule. The schedule of each of the AGVs 114 may be coordinated such that an optimal flow can be achieved, as discussed elsewhere herein.

In some implementations, the REX 118 may include or may communicate with a SKU (e.g., a stock keeping unit or unique identifier identifying an item) routing engine, which may route items into different storage zones depending based on picking profiles of the items, which may be stored and maintained as item data 130. The SKU routing engine may dynamically monitor picking activity in the distribution facility, track which items have the highest volume or velocity for a given timeframe, store the tracking data in the data store 120, and instruct the REX 118 to have items relocated by AGVs to different locations in the distribution facility based on the tracked activity.

The dispatch system 106 may be electronically communicatively coupled to a plurality of automated guided vehicles (AGVs) 114. In some implementations, the dispatch system 106, or elements thereof, may be integrated with or communicatively coupled with the REX 118. The dispatch system 106 includes hardware and software configured to dispatch the AGVs and is coupled for communication the components of the system 100 to receive instructions and provide data. The dispatch system 106 may calculate a route to execute the task considering traffic and resources. In some cases, it adjusts the route or the task in order to make the route efficient.

The AGVs 114 are robotic vehicles including drive units providing motive force for moving the AGVs (and, in some instances, carts, storage units, etc.), guidance systems for determining position of the AGVs 114 within the distribution facility, and equipment for carrying items. Some AGVs 114 may be attached to, include, or carry carts, which, in turn, carry items.

The WMS 104 may, in some implementations, include one or more hardware and/or virtual servers or software routines storable in one or more non-transitory memory devices and executable by one or more processors to perform the operations, acts, and/or functionality described herein. The WMS 104 may be configured to store and maintain data in the data store 120. In some implementations, the WMS 104 may be configured to communicate with the WES 102, the human interface system 108, dispatch system 106 and/or other systems in real time, in batches, as requested by these components, etc. For example, the WMS 104 may receive order data from an e-commerce or other server, process the data, and update various data in the data store 120 based on the order data. Similarly, the WMS 104 may detect and update inventory and other data.

The human interface system 108 may, in some implementations, include one or more hardware and/or virtual servers or software routines storable in one or more non-transitory memory devices and executable by one or more processors to perform operations, acts, and/or functionality described herein. The human interface system 108 may provide instructions and/or receive pick confirmations, for example, from pickers or operators (e.g., using barcode scanners, NFC, RFID or radio-frequency identification chips, or other sensors or input methods) working within a pick zone confirming that picks for a given carton have been performed, as described in further detail below. An example human interface system 108 may include a pick-to-voice, pick-to-light, or graphical user interface system. The human interface system 108 may be configured to communicate the pick confirmation data with the WES 102, WMS 104, or other components of the system in real time, in batches, as requested by the components of the system, etc.

The human interface system 108 may send instructions or receive confirmatory input (e.g., pick confirmations) to/from human agents, for example, who are picking items, interacting with a transfer station 150, or otherwise. The human interface system 108 transmits the confirmatory input to the WES 102. The confirmatory input may include the time stamp reflecting completion of the operations, a unique identifier identifying the picker (e.g., an operator or human agent), a unique identifier identifying the pick zone, a unique identifier identifying the AGV, and/or a unique identifier identifying the carton.

The data store 120 is an information source for storing and providing access to data. The data stored by the data store 120 may be organized and queried using various criteria including any type of data stored by it. The data store 120 may include data tables, databases, or other organized collections of data. An example of the types of data stored by the data store 120 may include, but is not limited to map data 122, carton data 124, order data 126, AGV data 128, item data 130, conveyor data 132, transfer station 150 data 134, etc. In some instances, the data store 120 may also include conveying system attributes, picking data, agent attributes, sensor data, etc.

The data store 120 may be included in the WES 102, WMS 104, REX 118, or in another computing system and/or storage system distinct from but coupled to or accessible by the WES 102, WMS 104, REX 118, or other components of the system 100. The WES 102, human interface system 108, REX 118, and/or dispatch system 106, for example, may store and maintain data in the data store 120. The data store 120 can include one or more non-transitory computer-readable mediums for storing the data. In some implementations, the data store 120 may store data associated with a database management system (DBMS) operable on a computing system. For example, the DBMS could include a structured query language (SQL) DBMS, a NoSQL DMBS, various combinations thereof, etc. In some instances, the DBMS may store data in multi-dimensional tables comprised of rows and columns, and manipulate (e.g., insert, query, update and/or delete) rows of data using programmatic operations.

The map data 122 may include data reflecting the 2- or 3-dimensional layout of the facility including the location of storage units, picking areas, lanes, equipment, storage shelving units, items, AGVs 114, conveyors, transfer stations 150, etc. Map data 122 may indicate the attributes of the distribution facility, including attributes of zones of a warehouse. For example, attributes of zones may include the number, quantity, and location of shelving units or bays, storage units, items, guidance system locators or markers, etc.

The carton data 124 may include information about cartons and/or containers in the system, such as a unique identifier or license plate number for each carton or container, a carton or container type, the zones a carton will visit, the number of pick lines a carton proceeds through, and the priority for the carton. The carton data 124 may include a picklist defining the items the carton will contain. The carton data 124 may include size or configuration of a carton, current location of the carton, associated transfer station 150, or other details.

The order data 126 includes data about orders, items picked, items to be picked, picking performance, confirmations, locations of items, etc. Order data 126 may indicate the quantity and identity of items in orders, shipping addresses, order priority, progress of order fulfillment, number of cartons in an order, sub-orders when and order is split into multiple cartons, etc.

The AGV data 128 may describe the state of an AGV (operational state, health, location, battery life, storage capacity, items being carried, cartons, etc.), whether picker assigned to it, etc.

The item data 130 may describe items in a distribution facility. The item data 130 may include unique identifiers for these items, the item volume (e.g., the total amount picked in given window (e.g., in an hour, day, etc.)), the item velocity (e.g., number of different times item picked in given window (e.g., per hour, day etc.), the location of the items within the distribution facility (aisle, shelf, shelf position, etc.), other attributes of the item (e.g., size, description, weight, quantity of items in a package, color, etc.), item inventory, or mapping of items to storage units, orders, conveyor locations, transfer stations 150, etc. In some implementations, the item data 130 may include the quantity of particular items a storage unit contains, the current location of a storage unit, a storage location of items and/or storage units, and other data. For instance, the item data 130 may include visual aspects, labels, QR codes, identifying markers, etc., that may be used by the WES 102 or equipment controller(s) 110 to identify items, for example, based on a scan of an item. In some instances, item data 130 may identify items in a consolidation area 426 of a given transfer station 150, in a carton or carton-receiving area 422 of a given transfer station 150, or other identifying or location data.

The conveyor data 132 may include various data pertaining to the conveyors 144 and 146, for example. For example, the conveyor data 132 may describe the state of a conveyor 144 or 146, such as the location, speed, operational state, health, capacity, attributes, items being carried, cartons, or other data.

The transfer station data 134 may include various data pertaining to the transfer station(s) 150, such as the state of each transfer station 150, such as its location, speed, operational state, actuation or transfer errors, health, capacity, attributes, item(s) in or assigned to the transfer station 150 (e.g., whether in a consolidation area 426 or carton/carton-receiving area 422), order(s) assigned to the transfer station 150, cartons in or assigned to the transfer station 150, or other data. In some instances, the transfer station data 134 may describe status or identifications of items in a consolidation area 426 and/or cartons in a carton-receiving area 422. For instance, each transfer station 150 have associated therewith in a computer-accessible data table, a row or column of data indicating presence of items, identification of items, presence of cartons, identification of cartons, identification of item or carton sizes, or other information.

The components of the system 100 may be coupled to exchange data via wireless and/or wired data connections. The connections may be made via direct data connections and/or a computer network. The computer network may comprise any number of networks and/or types of networks, such as wide area networks, local area networks, virtual private networks, cellular networks, close or micro proximity networks (e.g., Bluetooth, NFC, etc.), etc. In some implementations, one or more of these components may be coupled via a data communications bus.

Figure 2:
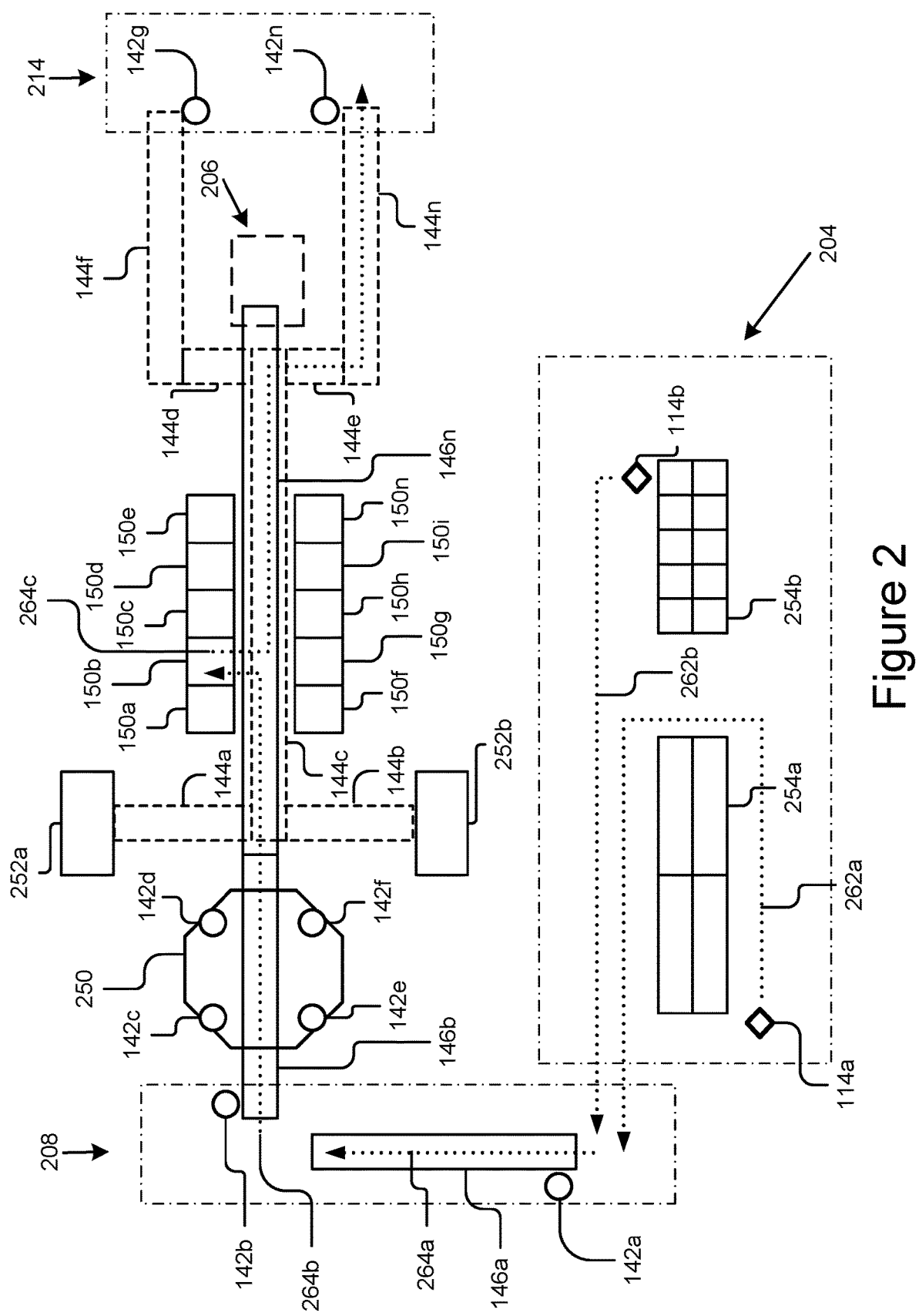
FIG. 2 depicts a schematic of an example configuration of a distribution facility, which may be an operating environment of the automated sorting and packing system.

FIG. 2 depicts a schematic of an example configuration of a distribution facility, which may be an operating environment of the automated packing and sorting system. It should be understood that various distribution facilities may include different configurations. For instance, the facility may have different zones or devices, different configurations, layouts, etc. The layout depicted in FIG. 2 includes various areas, such as an induction area 208, a storage area 204, and a finalizing area 214, for example, in addition to other equipment 152 described herein. In some cases, the layout may include multiple levels of mezzanine with one or more of the different zones/areas. The layout may also include a replenishment area in which storage units are replenished with items.

The storage area 204 may include various shelves 254a and 254b, which may store items or other objects. For example, the shelves 254a may be divided into bays from which items may be picked by human or robotic pickers. For instance, human pickers may take items from the shelves 254a and place them into a tote or container, such as the batch container described herein. In some instances, the REX 118 may instruct an AGV 114a to autonomously visit (e.g., following the example path 262a) the shelves 254a where items are placed into batch containers and then transported, by the AGV 114a to an induction area 208, for example, to a conveyor 146a, induction station, or induction point. For instance, the human interface system 108 may instruct a picker to place items from the shelves 254a into batch containers, from the batch conveyors onto item conveyors 146, or other operations, as described elsewhere herein.

The storage area 204 may additionally or alternatively include shelves 254b from which a second AGV 114b may retrieve containers of items, for example, batch or other containers. The REX 118 may instruct the second AGV 114b to transport (e.g., following example path 262b) the container to an induction area 208, for example, to a conveyor 146a, induction station, or induction point. The AGVs 114a and 114b may include guidance systems using guidance system locators or markers, such as guide tape, laser targets, vision guidance, etc.

The induction area 208 may include various induction equipment 140 or induction stations where items may be inducted into the sorting system, for example, onto the item cartons. In some implementations, the induction area 208 may include a scanner 142a, for example, at the beginning or end of a conveyor 146a or at an induction point, which may scan batch containers and/or items to identify the containers or items. For instance, an AGV 114a or picker may place a batch container of items onto a conveyor 146a, which transports the batch container to an induction station, where the items in the container may be individually placed onto a conveyor 146b.

For example, the scanner 142a and/or 142b may scan and identify the batch container at 142a or 142b and the human interface system 108 may instruct a device or picker to individually place item(s) from the container onto an item conveyor 146b, for example. For instance, a conveyor 146b may have segments or divisions onto which single items may be placed. In some implementations, as described below, the WES 102 may identify the items and/or orders with items in the batch container based on the scan at 142a and/or 142b. Depending on the implementation, when it identifies the batch container, the WES 102 may prepare a carton for the identified order(s), as described below.

In some implementations, the induction area 208 or other location in the facility may include other induction equipment 140 for preparing cartons for other operations described below. For instance, the facility may include one or more case erectors 252, label applicators, and/or other equipment.

A case erector 252 may include a device or station at which cartons are erected automatically or manually, for example, from flat-pack cartons and, potentially, placed onto a carton conveyor 144a or 144b or directly into a transfer station 150. FIG. 2 illustrates two case erectors 252a and 252b, although additional, fewer, or no case erectors 252 may be used. For example, a first case erector 252a may prepare cartons of a first size or configuration and a second case erector 252*b* may prepare cartons of a second size or configuration. Accordingly, the WES 102 may induct cartons of corresponding to order sizes (e.g., quantity or size of items in orders) into the sorting system to match identified items/orders.

For example, a case erector 252 may be utilized to automatically erect the cartons to fulfill orders. Depending on the implementation, the case erector 252 may continually prepare cartons and induct them into the system until the carton-receiving area s 422 of the transfer stations 150 are full (e.g., the WES 102 may instruct case erectors 252 to stop erecting cartons when the transfer stations 150 are full). Additionally or alternatively, the case erectors 252 or other induction equipment 140 may induct cartons responsive to and/or otherwise based on identified order(s) or an item in the order(s).

The case erectors 252 may include label applicators for applying labels to cartons or label applicators may be along a carton conveyor 144*a* or 144*b* and may apply labels to cartons as they pass. Additionally or alternatively labels may be previously applied and/or printed on the cartons to uniquely identify the cartons, which identifiers may be used by the WES 102 to identify a specific carton during the automated sorting and packing process, upon finalizing, and/or at other points.

For example, a carton may have a license plate number (LPN) or other identifier applied thereto which may be used by the WES 102 to track and identify the carton. The LPN may include or be determined based on a bar 568 code or QR code on the carton, although other implementations are possible, such as RF ID tags, etc. The LPN may link, in the computer memory of the WES 102, a specific carton with a specific order and/or specific item(s). Accordingly, the WES 102 can verify that the correct items are placed into the correct carton.

A label applicator may autonomously apply an LPN to a carton, which is matched to an order. For instance, a label applicator may automate the process of applying a unique code or LPN to each carton. An equipment controller(s) 110, such as a programmable logic controller, may use the LPN to direct cartons either separate to or using communication with the WES 102.

Although the LPN may include or be part of a shipping label, it may be separately applied. For instance, an LPN may be applied to or associated with a carton when the carton is erected or inducted, and a shipping label may be applied to the carton at the finalizing area 214. For instance, the LPN may be scanned by a scanner 142*g* or 142*n* in the finalizing area 214 to identify the carton and associated order. The WES 102 may instruct a printer, label maker, or label applicator to print a shipping label for the identified order. Application of the shipping label may be part of the quality control process. Accordingly, the LPN can be used at finalizing to automate the shipping process.

A carton may be inducted into the system, for example, by applying or associating LPNs to the carton, which may be a container, such as a shipping carton (e.g., a cardboard box that is shipped to an external address to the facility, such as a customer's residence). Accordingly, by sorting items directly into a carton, operations can be reduced in the facility, thereby improving throughput, reducing resource (e.g., processer, electrical, and equipment) utilization, and reducing errors.

In some implementations, a carton may be conveyed and sorted using a carton sorter, which may include one or more carton conveyors 144 and other equipment that move the cartons to and from a transfer station 150 (e.g., an assigned transfer station 150) or elsewhere in a facility. For instance, a carton conveyor 144 may include a conveyor belt, conveyor rollers, chain conveyors, or similar object-handling mechanisms that move objects.

For example, FIG. 2 illustrates multiple carton conveyors 144 that convey cartons. The carton conveyors 144 may be a single conveyor or multiple conveyors. As illustrated in the example of FIG. 2, the carton conveyors 144*a* and 144*b* may move cartons from erectors 252*a* and 252*b*, respectively. Cartons may move from carton conveyors 144*a* or 144*b* and onto carton conveyor(s) 144*c*, which may convey the carton(s) past or to transfer stations 150. A carton on the carton conveyor 144*c* may be diverted from the carton conveyor 144*c* into a carton-receiving area 422 of a transfer station 150. For instance, the carton conveyor 144 may include a motorized drive roller conveyor (e.g., 450) that can divert items horizontally, for example, into a carton-receiving area 422 of a transfer station 150, although other types of diverting mechanisms, such as those described herein, are possible.

Items may be diverted into an assigned transfer station 150, which may, using a sensor, determine that the item or multiple items are in the consolidation area 426 of the transfer station 150. The WES 102 and/or equipment controller(s), upon determining that the item(s) are in the consolidation area 426, may send an actuation signal to a transfer station 150 (or an instruction to a human interface system 108) instructing the transfer station 150 to transfer the item(s) into a carton. In some instances, the transfer station 150 may identify that the items are in the carton and/or out of the consolidation area 426 and transfer the carton out of the carton-receiving area 422. Other examples and detail for the transfer station 150 and use thereof are described elsewhere herein.

Once a carton is complete (e.g., when all items from an order are sorted into the carton), the WES 102 and/or equipment controller(s) 110 may divert items from the transfer station 150 and onto the carton conveyor 144*c*, another carton conveyor 144 (e.g., on a different side of the transfer station 150, or otherwise transported (e.g., using an AGV 114 or picker that retrieves the packed carton from the transfer station 150). For example, the WES 102 may direct the carton to be transfer to the conveyor 144*c* and to an end point, depending on availability of a finalizing station or attributes of the carton or order. For instance, the WES 102 may direct/transfer the carton to finalizing via carton conveyors 144*d* and 144*f* or carton conveyors 144*e* and 144*n*.

In some implementations, a finalizing area 214 may include stations, printers, carton-taping mechanisms, or other devices for finalizing a carton for shipping. For example, a robot or human agent in a finalizing station of a finalizing area 214 may scan a carton (e.g., an LPN of a carton) using a scanner 142*g* and 142*n* thereby identifying the carton and associated order to the WES 102. The WES 102 may print a shipping label and/or packing slip for the carton based on the scan. The robot or agent may apply the shipping label, place the packing slip (and/or verify the items in the carton using the packing slip), close and tape the carton, and send the carton for shipping.

The item conveyor(s) 146 may include a conveyor belt, conveyor rollers, chain conveyors, or similar object-handling mechanisms that move objects, for example, the item conveyor(s) 146 may be the same or different conveyors or conveyor types as the carton conveyor(s) 144. In some implementations, items and cartons may be conveyed on the same conveyors but conveyed to different parts of a transfer station 150. In some implementations, items and cartons may be conveyed on separate conveyors, for example, as illustrated in the example configurations of FIGS. 2-3C. For example, item conveyor(s) 146 and/or carton conveyor(s) 144 may be adjacent or proximate to transfer stations 150 so that items and/or cartons can easily be transferred between the conveyors and the transfer stations 150.

Figure 3A:
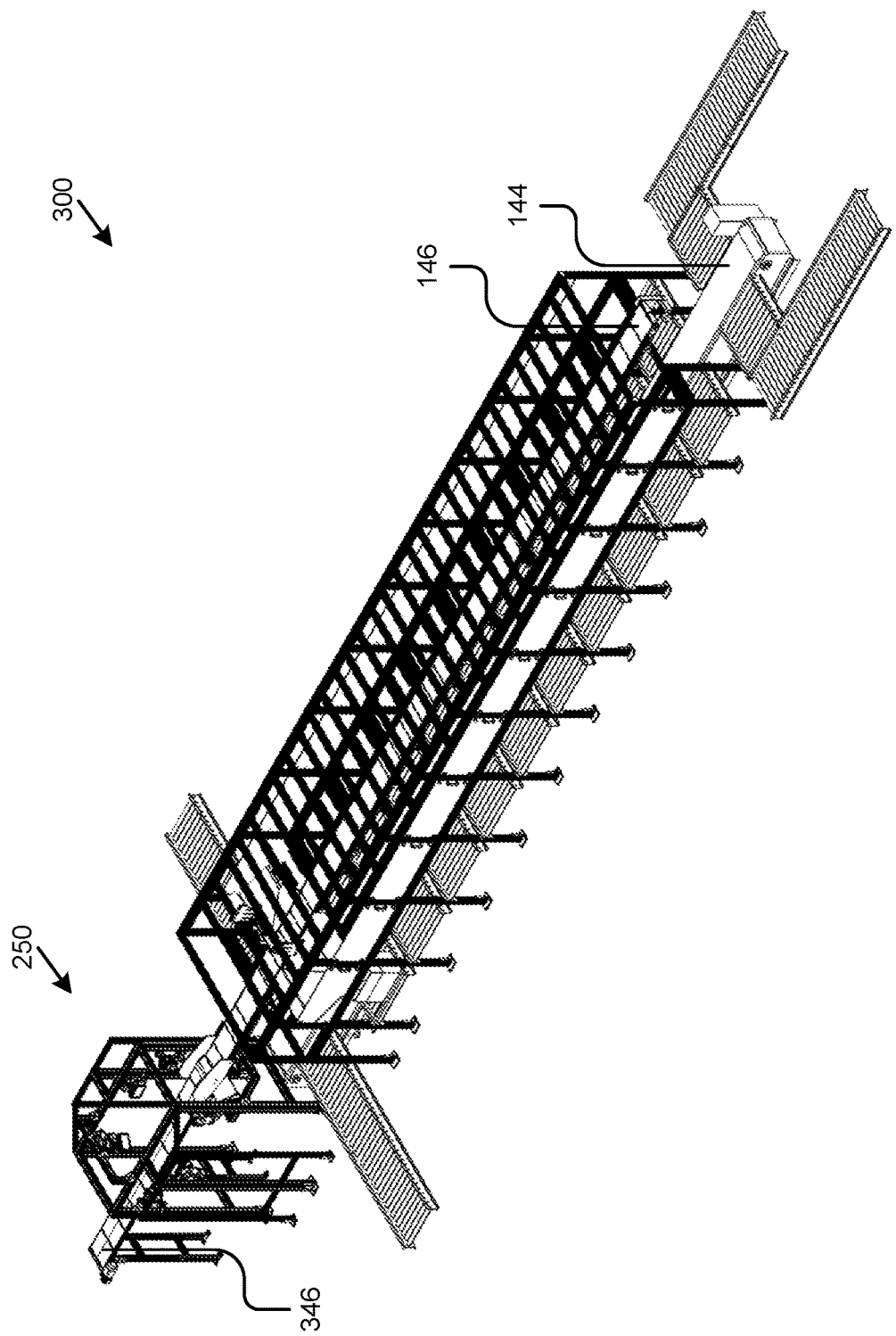
FIGS. 3A-3C illustrate an example automated sorting and packing system from various angles.

In some implementations, the item conveyor(s) 146 may be entirely or partially above or below the carton conveyor(s) 144, next to the conveyors, perpendicular, parallel, or otherwise configured. For instance, as illustrated in FIG. 3A, a carton conveyor 144 may extend partially underneath an item conveyor 146, example, when the conveyors pass next to the transfer stations 150. The item conveyor(s) 146 and/or carton conveyor(s) 144 are described in further detail below, for example, in reference to FIGS. 3A-3C.

In some implementations, items may be placed on an item conveyor 146 that conveys items passed one or more scanners 142. For example, a batch container may be scanned at scanner 142b at which the WES 102, via the human interface system 108, may instruct a robot or human agent to place the items in the container onto the conveyor 146b, for example, one by one. The conveyor 146b may convey the item(s) past scanners 142c, 142d, 142e, and/or 142f, which may be organized into a scan tunnel 250, and which may scan the item (e.g., optically scan to identify visual aspects, bar 568 codes, labels, etc., of the item(s)) and transmit the identifying information to the WES 102. The scan tunnel 250 may be located in advance of the transfer stations 150 along a direction of movement of one or more item conveyors 146, so they scan an item before it reaches a transfer station 150. In some implementations, the scan tunnel 250 may house one or more scanners 142 so that they point toward items on the item conveyors 146.

In some implementations, once the scanned item(s) pass through the scan tunnel 250 where they are identified, they are then conveyed on the same or a separate conveyor 146n. The WES 102 may track an item's position on the item conveyors 146 using further scans, optical or other sensors, or based on a known position of the item on the item conveyor(s) 146, for example, based on the scan and/or a position of the conveyor(s) (e.g., based on a movement or position data of the conveyor(s)).

The item conveyor 146n may convey items to or past one or more transfer stations 150, which may be configured to transfer items between an item conveyor 146n and a carton. Example transfer stations 150a, 150b, 150c, 150d, 150e, 150f are located along a first side of an item conveyor 146n and transfer stations 150f, 150g, 150h, 150i, and 150n are located along a second, opposing side of the item conveyor 146n. Accordingly, items can be diverted perpendicular to a direction of travel of the item conveyor 146n into transfer stations 150 on either side. In some implementations, the transfer stations 150a-150n may be located in sequence next to each other (e.g., touching each other) in a high-density to improve space utilization and sorting speed. Example diverters 148 and transfer stations 150 that allow the close proximity and rapid sorting are described in further detail below. It should be noted that other configurations are possible and contemplated. For instance, although an example layout and quantity of transfer stations 150 are shown, they may be different in number, layout, or configurations.

In some implementations, one or more items may be diverted into a transfer station 150 consolidation area 426 of a transfer station 150 and a carton may be transferred into a carton-receiving area 422 of the transfer station 150. The transfer station 150 may then be instructed, by the WES 102 to transfer the item(s) into the carton, as described elsewhere herein. A diverter 148 for transferring items from an item conveyor 146 into a consolidation area 426 (or a carton from a carton conveyor 144 into a carton-receiving area 422) may be a pneumatic pusher, motorized arm, movable wall, paddle-conveyor system (e.g., the diverter mechanism 450), or other devices.

A transfer station 150 may use various mechanisms for transferring items into a carton. For example, a transfer station 150 may include a robotic arm that manipulates items, a diverter 148 that slides items into a carton, a trap door that drops items into a carton, a chute 428 that slides items into a carton, other mechanisms, or combinations thereof. For example, the transfer station 150 may have an item consolidation or receiving area, a carton-receiving area 422, and a mechanism for transferring items from the consolidation area 426 to a carton in the carton-receiving area 422. Example implementations of the transfer station 150 are described in further detail below.

In some implementations, the one or more item conveyors 146 may include or terminate an exemption or jackpot zone 206 to which items may be transported, for example, if there is an error or exemption. For example, if the WES 102 determines that no transfer station 150 is available to assign an order, item, or carton, an item may be transported to a jackpot area 206 at which a robot or human agent may manually or automatically sort the item into a carton or set it aside for later use. Similarly, if an item is not properly scanned, was improperly picked (e.g., to a batch container), or another error is present, the WES 102 may direct the one or more item conveyors 146 to the jackpot area 206.

Although other implementations are possible and contemplated herein, example steps for picking, sorting, packing, and finalizing an order are illustrated in the paths 262a, 262b, 264a, 264b, and 264c. For example, as described above, the WES 102 may select a set of orders with an associated set of items to be picked by a human agent or AGV 114a and/or 114b, which may follow the path(s) 262a and/or 262b to collect the set of items for the batch (e.g., into one or more containers, a cart, etc., as noted elsewhere herein). The set of items may be transported to the item conveyor 146a and conveyed (e.g., in a container or directly on the item conveyor 146a) to an induction area 208 via the path 264a or, alternatively, the batch of items may be brought directly to the beginning of the conveyor 146b. In implementations where the set of items in the batch is in one or more containers, the containers may be associated with the items sorted therein as well as the orders associated with those items. The batch container may be scanned at the scanner(s) 142a and/or 142b to identify the batch. At this point, earlier (e.g., upon selecting the set of items for the batch), or later (e.g., upon scanning by the scan tunnel 250), transfer stations 150 may be assigned and/or cartons may be prepared and sent to corresponding transfer stations 150, as described in further detail below.

In some implementations, the set of items may be placed individually on an induction conveyor (e.g., 346), which may be item conveyor 146b and pass through the scan tunnel 250. For instance, an item may be placed individually on the item conveyor 146b at the path 264b, where it is conveyed through the scan tunnel 250, onto item conveyor 146n, and then diverted into an assigned transfer station 150b, for example, into a consolidation area 426 of the transfer station 150b. In some implementations, if all items for a given carton and/or order are in the consolidation area 426 of the transfer station 150b (or based on another trigger), the WES 102 or equipment controller(s) 110 may transfer the item(s) into a carton in a carton-receiving area 422 of the transfer station 150 (e.g., which may have been transferred, in coordination with the item(s), to the transfer station 150). The carton into which the item was transferred may be diverted onto the carton conveyor 144c upon completion and determination of an opportunity on the carton conveyor 144c. As illustrated in the example, the carton may be conveyed on the path 264c using the carton conveyors 144c, 144e, and 144n to the finalizing area 214. In some instances, upon arriving at the finalizing area 214, the carton (e.g., the LPN on the carton) may be scanned by the scanner 142n. The WES 102 may identify the carton and associated order based on the scan data. The WES 102 may then mark the carton or order as complete, print a packing slip, print a shipping label, request verification that the items in the carton are correct, or perform other operations.

Other equipment and configurations may also be included, although not illustrated in FIG. 2. For example, the system may include separate label (e.g., LPN and/or shipping label) applicators, scanners 142 along the conveyors, scanners 142 at transfer stations 150, diverters 148 between conveyors (e.g., at the intersection of carton conveyors 144c, 144d, and 144e), or other equipment.

Figure 3B:
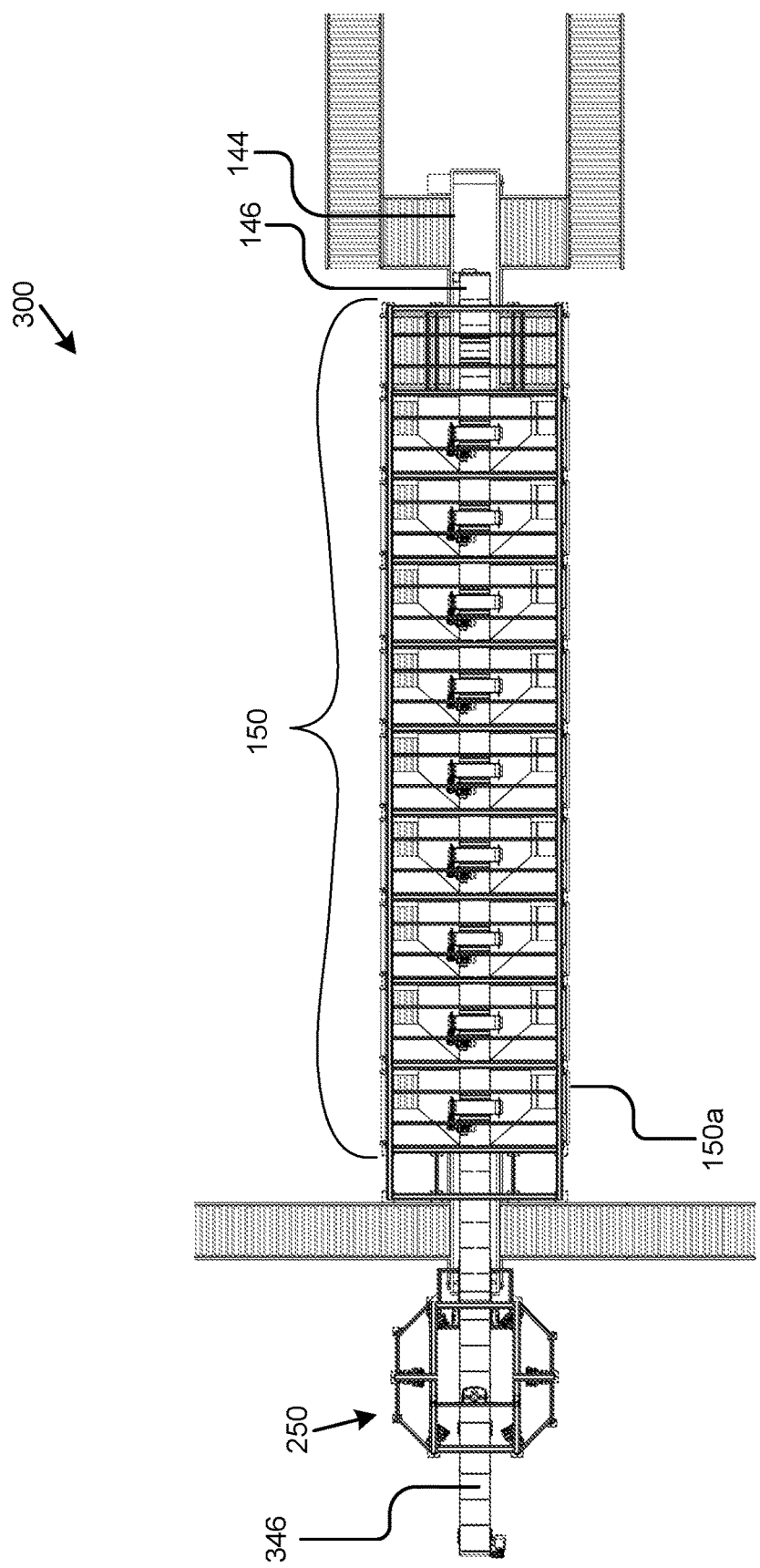
Figure 3C:
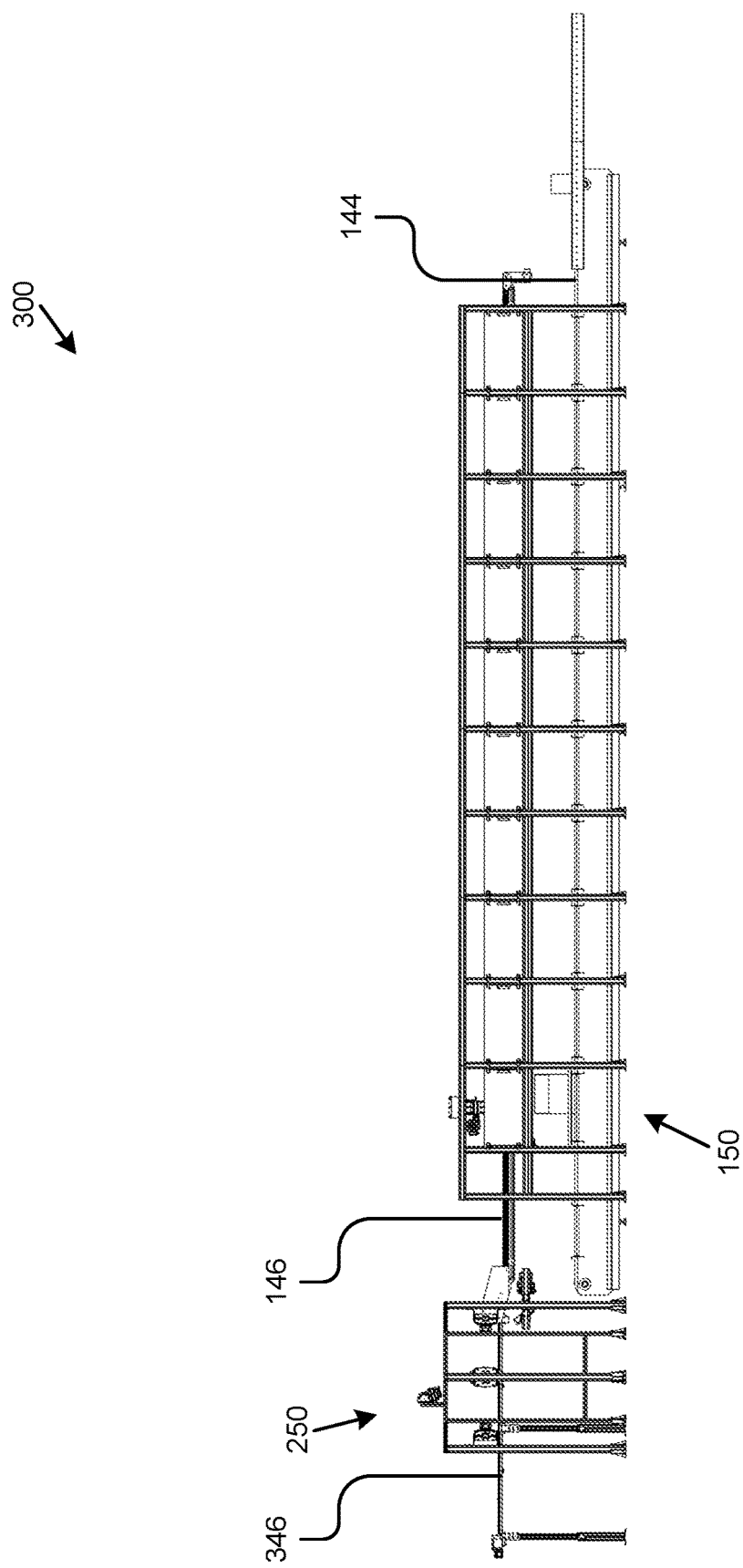

FIGS. 3A, 3B, and 3C illustrate an example automated sorting and packing system 300, which may include one or more transfer stations 150, from various angles. FIG. 3A illustrates the example system 300 from a perspective view, FIG. 3B illustrates a top-down view of the example system 300, and FIG. 3C illustrates a right-side view of the example system 300.

As illustrated in FIGS. 3A-3C, the example automated sorting and packing system 300 may include a scan tunnel 250, item sorter, and carton sorter, although other implementations are possible. For example, the item sorter and carton sorter may include a set of multiple transfer stations 150. Various details and example features of the example system 300 are described elsewhere herein.

As illustrated, a scan tunnel 250 may be located at the beginning of an item sorter, which is configured to sort items into transfer stations 150 and/or into cartons. For example, the item sorter may include item conveyor(s) 146, diverters, transfer stations 150, and/or other equipment.

As illustrated in the examples, the system 300 may include an item conveyor 146 with a conveyor belt, which passes by multiple transfer stations 150 (e.g., ten transfer stations 150 or chutes 428 on the sides of the item conveyor 146). For instance, the item conveyor 146 may include a cleated belt with a zone for each product. The item conveyor 146 may have a variable frequency drive, which allows it to stop or move accurately to allow items to be scanned or diverted, for instance. The item conveyor 146 may include stopping or homing sensor(s), which indicate when an item is next to the correct/assigned chute 428 or transfer station 150. The variable frequency drives and homing sensors may allow the equipment controller(s) 110 or WES 102 to determine when an item has crossed a threshold and should be diverted into a certain transfer station 150 or otherwise tracked.

FIGS. 3A-3C illustrate ten transfer stations 150 flanking each of the item conveyors 146 and carton conveyors 144. For simplicity, only two of the twenty transfer stations 150 in FIGS. 3A and 3C are illustrated as including chutes 428 and diverter mechanisms, while eighteen of the twenty transfer stations 150 in FIG. 3B are illustrated with chutes 428 and diverter mechanisms. Various transfer stations 150 may include the same or different configurations. For instance, some of the transfer stations 150 may be designed to accommodate different sizes of orders or cartons or they may be configured to be applicable to any size order or carton. Example transfer stations 150 are described elsewhere herein, for instance, in further detail below in reference to FIGS. 4A-7.

The item sorter may include item chutes 428 and/or transfer stations 150 (e.g., a transfer station 150 may include a chute 428) located along an item conveyor 146. The item sorter may also include one or more diverters, as described elsewhere herein, which divert items from the item conveyors 146 into a chute 428 and/or transfer station 150. For instance, a transfer station 150 may be proximate to an item conveyor 146, so that a diverter may divert an item from the item conveyor 146, into a chute 428 of the transfer station 150, which causes the item to slide to a consolidation area 426 of the transfer station 150 (e.g., a consolidation area 426 may include or be located at the end of a chute 428), as described in further detail below.

In some implementations, as illustrated in the example of FIGS. 3A-3C, an item conveyor 146 may include one or more conveyors that extend longitudinally along an axis and may pass through a scan tunnel 250 and past one or more transfer stations 150, although the item conveyor(s) 146 may have one or more bends or turns. Similarly, the transfer stations 150 may be on a single side, both sides, or configured differently. The transfer stations 150 may be closely spaced, for example, touching each other or using common frames, in order to increase number of stations that fit in the available space.

In some implementations, the one or more item conveyors 146 may include an induction conveyor 346, which passes through the scan tunnel 250 and from which items may fall or be transferred from the induction conveyor 346 onto another item conveyor 146. The induction conveyor 346 may include painted lines on a conveyor belt, which are spaced so that a robot (e.g., using an optical sensor) or human agent can view the lines and place an item between each line. The space of between the lines may be referred to as an induction zone, and each induction zone may be large enough to fit an item and separate the item from other items on the induction conveyor 346 (e.g., to allow the item to be scanned without interference). In some implementations, depending on the configuration of the scanners 142, items may be placed with a UPC (universal product code) barcode facing upward in each induction zone.

The automated sorting and packing system may also include a carton sorter, which transports cartons (e.g., shipping cartons or boxes) to or from transfer stations 150. For example, a carton sorter may include one or more carton conveyors 144, scanners 142/sensors, diverters, and other devices. For example, a carton conveyor 144 may extend parallel and underneath an item conveyor 146, as illustrated, in order to efficiently use space, and allow the carton conveyor 144 to receive items from transfer stations 150 on both sides.

In some implementations, the one or more carton conveyors 144 may start at a case erector 252, pass transfer stations 150, and/or end in a finalizing area 214. For instance, as illustrated in reference to FIG. 2, one or more carton conveyors 144 may originate at multiple case erectors 252, combine into a single conveyor below an item conveyor 146, and then branch off again to multiple finalizing stations in a finalizing area 214, although other configurations are possible. For instance, one or both of the item conveyors 146 and carton conveyors 144 may have multiple lanes or branches that convey objects to different areas, transfer station(s) 150, induction area(s), or finalizing area(s).

As illustrated, each transfer station 150 may include a carton-receiving area 422, which connects to, is adjacent to, or is otherwise proximate to a carton conveyor 144, so that cartons may be transferred between the carton-receiving area 422 and the carton conveyor 144. In some implementations, a carton-receiving area 422 may include rollers, a conveyor, or another mechanism (whether motorized or not) for transporting a carton within the carton-receiving area 422 or to/from the carton conveyor 144. For example, a carton may be transferred from the carton conveyor 144 into a carton-receiving area 422 using a diverter or attribute of the carton conveyor 144. The carton-receiving area 422 may allow the item to roll or may transport the carton, so it is located under a chute 428 and/or door of the transfer station 150.

Figure 4A:
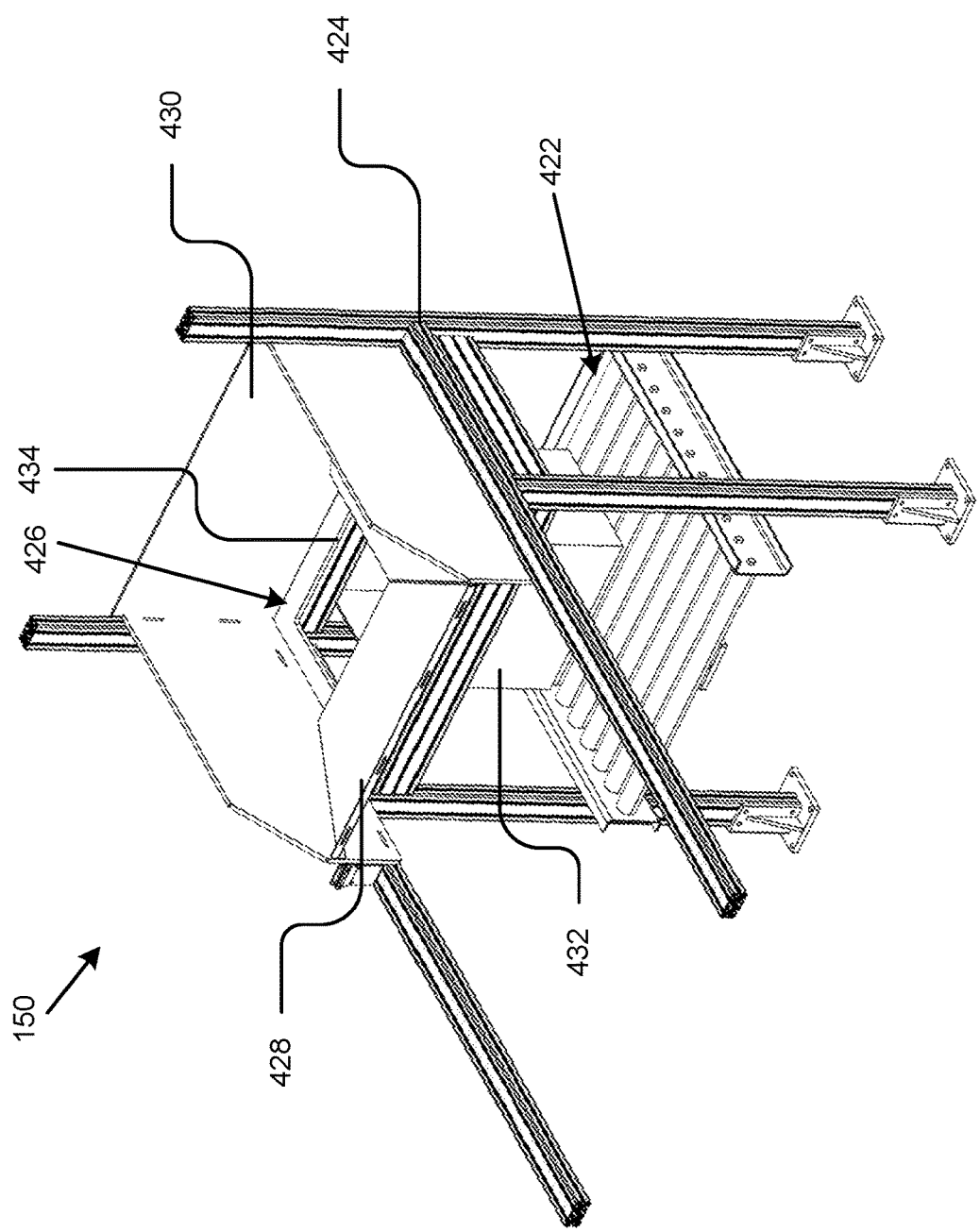
FIGS. 4A-4D illustrate various views of example transfer stations.

FIG. 4A illustrates an example transfer station 150. The example illustrated transfer station 150 includes a frame 424, an item or transfer station 150 consolidation area 426, a chute 428, a carton-receiving area 422, and one or more mechanisms for transferring items from a consolidation area 426 to carton-receiving area 422 (e.g., to a carton in the carton-receiving area 422). Other implementations, configurations, and devices may be used in addition or alternative to those described in reference to FIG. 4A, as noted elsewhere herein, such as in reference to FIGS. 4A-7.

The carton-receiving area 422 may include rollers, conveyors, walls, or other mechanisms, which align a carton to a corner, edge, or center of the carton-receiving area 422. For instance, a carton conveyor 144 (not shown in FIG. 4A) may, using a feature of the carton conveyor 144 or using another diverter mechanism, for example, divert a carton into the carton-receiving area 422, which may align the carton to a defined point. For example, FIG. 4A illustrates an example carton 432 (e.g., a shipping container, such as a carboard box for shipping completed orders to an external customer) at a back-side corner in the carton-receiving area 422. The carton-receiving area 422 may guide the carton 432 to a corner by one or more walls that stop movement of the carton 432 at the designated corner and one or more rollers or other mechanisms that push the carton 432. An opening, aperture, or passage 434 in the consolidation area 426 may be located at the same corner, so that items may be transferred into any size of carton aligned at the corner.

In some implementations, the transfer station 150 may also include walls 430 that prevent items from falling out of the chute 428 or consolidation area 426. One or more of the walls 430 may be transparent and/or hinged to allow blockages to be detected and/or dislodged. Additionally, the transfer station 150 may include a sensor that detects when items are in the consolidation area 426, so that blockages may be identified (e.g., if items are still present after they should have been transferred/a door has been opened between the consolidation area 426 and carton-receiving area 422).

The chute 428 may have one or more sloped walls, floors, or other surfaces, so that items diverted into the transfer station 150 rest on the chute 428 and/or a door of the opening (also referred to herein as a passage) 434. For instance, the opening 434 may be closed by a door (e.g., 564), as described elsewhere herein. The chute 428 may be constructed, for example, from metal, plastic, or another suitably strong material, which may be slippery or sloped at enough of an angle to cause items to slide down the slope. Additionally, the chute 428 may be configured so that items slide to a certain corner of the consolidation area 426 (e.g., the walls or floors may be angled toward a corner, offset from a center, etc.), for example, a passage 434 and door of the consolidation area 426 may be located at a back (e.g., away from an entrance of the transfer station 150 or item conveyor) side corner of the transfer station 150/consolidation area 426. Correspondingly, the carton 432 may be guided to the same corner in the carton-receiving area 422 below the passage 434, for example, by guides, such as rollers, a slope, one or more walls, or other devices, as described elsewhere herein.

The opening or passage 434 may include a passageway, channel, or other structure leading between the item-consolidation area 426 and the carton-receiving area 422, which may allow one or more items to pass from the consolidation area 426 to a carton 432 in a carton-receiving area 422. In some instances, the movement of the one or more items may be controlled by an actuation mechanism, as described in further detail below. The passage 434 may be located at a bottom of the consolidation area 426, as illustrated, or may be located on a side or otherwise. For instance, when the passage 434 is located on the bottom of the consolidation area 426, gravity may assist or cause the movement of items through the passage 434.

As illustrated in the example of FIG. 4A, the frame 424 or another structure may hold the consolidation area 426 (e.g., with the chute 428 and opening 434) above or vertically higher than the carton 432 and carton-receiving area 422. The frame 424 may couple the transfer station 150 to an item conveyor 146, carton conveyor 144, other transfer stations 150, and/or other objects. The frame 424 may also provide mounting points for various scanners 142, sensors, diverters, or other components. The frame 424 may be constructed from extruded aluminum, as shown in the example, but many other constructions are possible and contemplated herein.

Figure 4B:
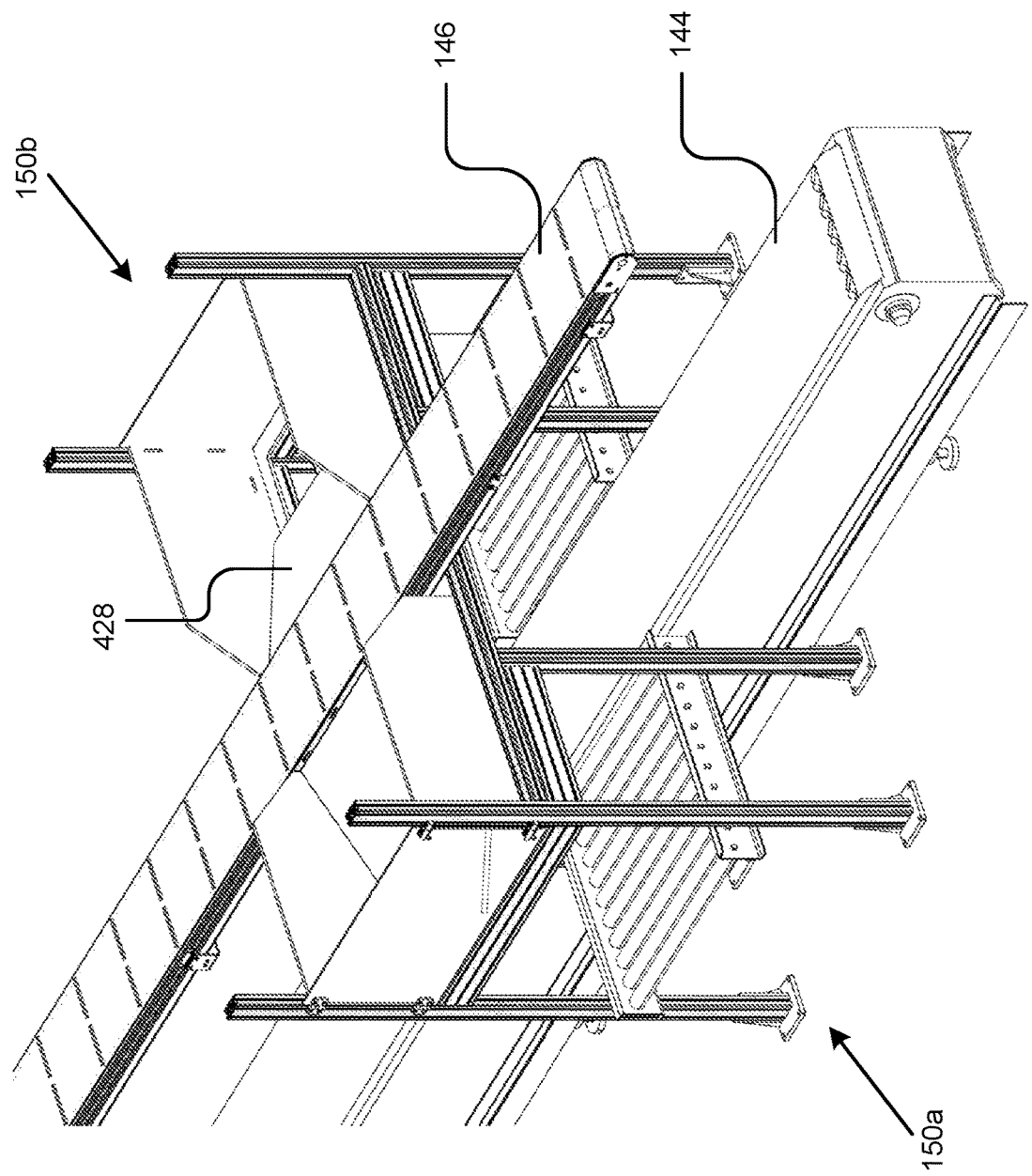

FIG. 4B illustrates an example pair of transfer stations 150a and 150b where one is on each side of an item conveyor 146 and a carton conveyor 144, each of which may be configured as illustrated and described in reference to FIG. 4A, although other implementations are possible. As shown, a transfer station 150a may have both the item conveyor 146 and carton conveyor 144 on a single side, although other implementations are possible, such as where the two conveyors are on opposing sides, perpendicular, or otherwise configured. For instance, multiple transfer stations 150a and 150b may share one or more frame members, which may, depending on the implementation, support a conveyor, diverter mechanism, or other devices.

As shown in the example of FIG. 4B, a chute 428 may be located downward from the item conveyor 146 (e.g., a top of the chute 428 may descend from an elevation of a top surface of the item conveyor 146) so that when an item is diverted from the item conveyor 146 onto the chute 428, the sloped wall(s)/floor(s) of the chute 428 causes the item to slide toward a door or opening 434 of the consolidation area 426. Additionally, in some implementations, a top surface of the carton-receiving area 422 (e.g., the rollers or conveyor thereof) may be level with a top surface of the carton conveyor 144, so that cartons can move to and from the same carton conveyor 144, although other implementations are possible (e.g., where the filled carton is transferred onto a separate, lower carton conveyor 144, or where an AGV 114 or human agent retrieves a carton).

Figure 4C:
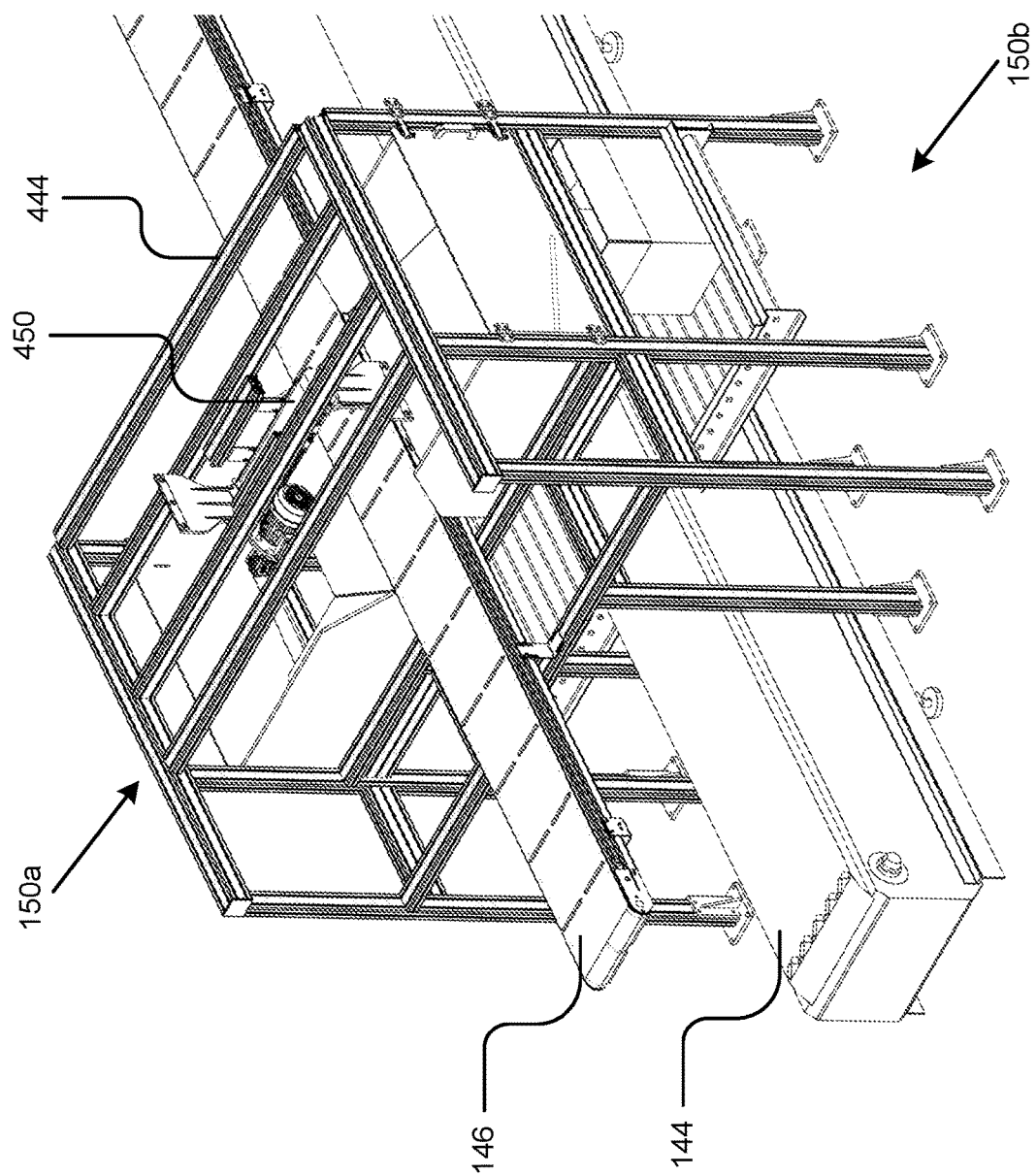

For example, as illustrated in the example of FIG. 4C, the transfer station 150 may include a consolidation area 426 proximate to an item conveyor 146 and a carton-receiving area 422 proximate to a carton conveyor 144. The carton conveyor 144 may be partially underneath and parallel with the item conveyor 146 at a point where the item conveyor 146 and carton conveyor 144 are each proximate to the transfer station 150. The consolidation area 426 may be located at a higher elevation, to the side of, directly above, at an angle to, or otherwise to the carton-receiving area 422.

Figure 4D:
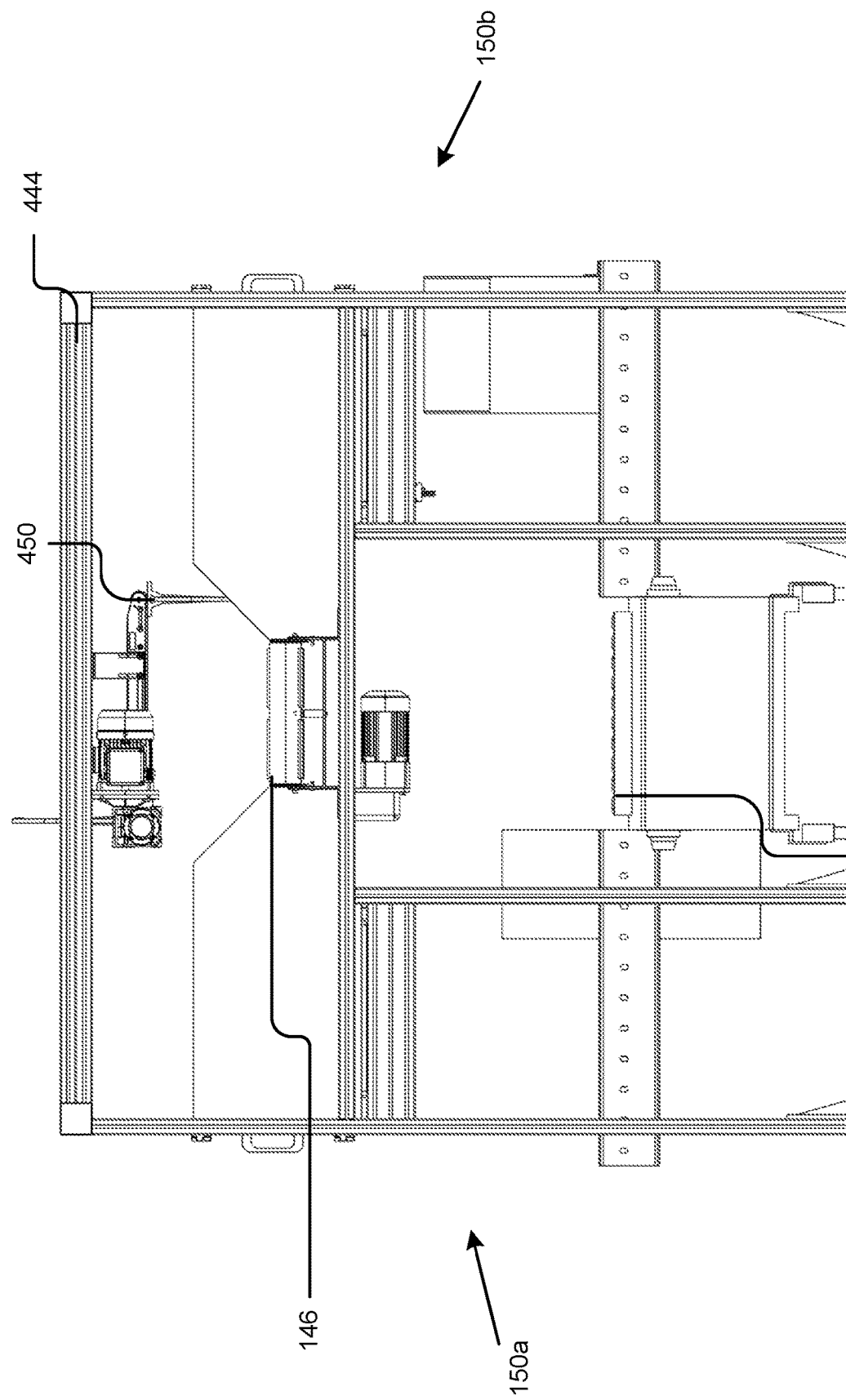

FIGS. 4C and 4D illustrate a pair of transfer stations 150 with an additional frame 444 located above the transfer stations 150 to hold an example diverter mechanism 450. FIG. 4C illustrates a perspective view of the transfer stations 150 and FIG. 4D illustrates an end view of the transfer stations 150. In the illustrated examples, the diverter mechanism 450 may include a conveyor belt 480 with paddles mounted thereto. For instance, the diverter mechanism 450 may rotate the conveyor belt 480, which, in turn, moves the paddles. It should be noted that other types of diverter mechanisms 450, such as pneumatic pushers, robotic arms, specialized conveyors, or other devices may be used to divert items and/or cartons.

Figure 5A:
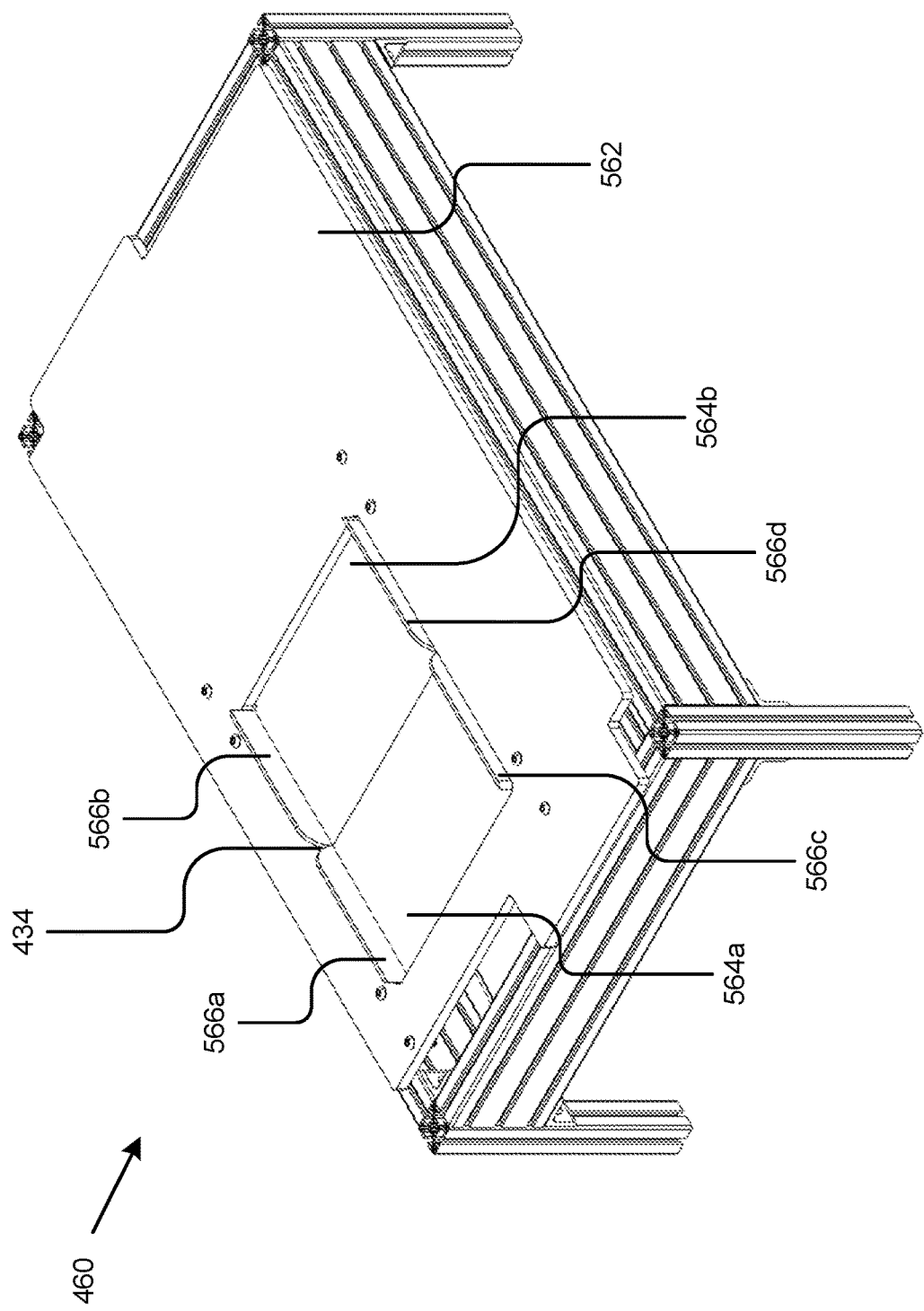
FIGS. 5A-5B illustrate various views of an example transfer-station table of an example transfer station in a closed position.
Figure 5B:
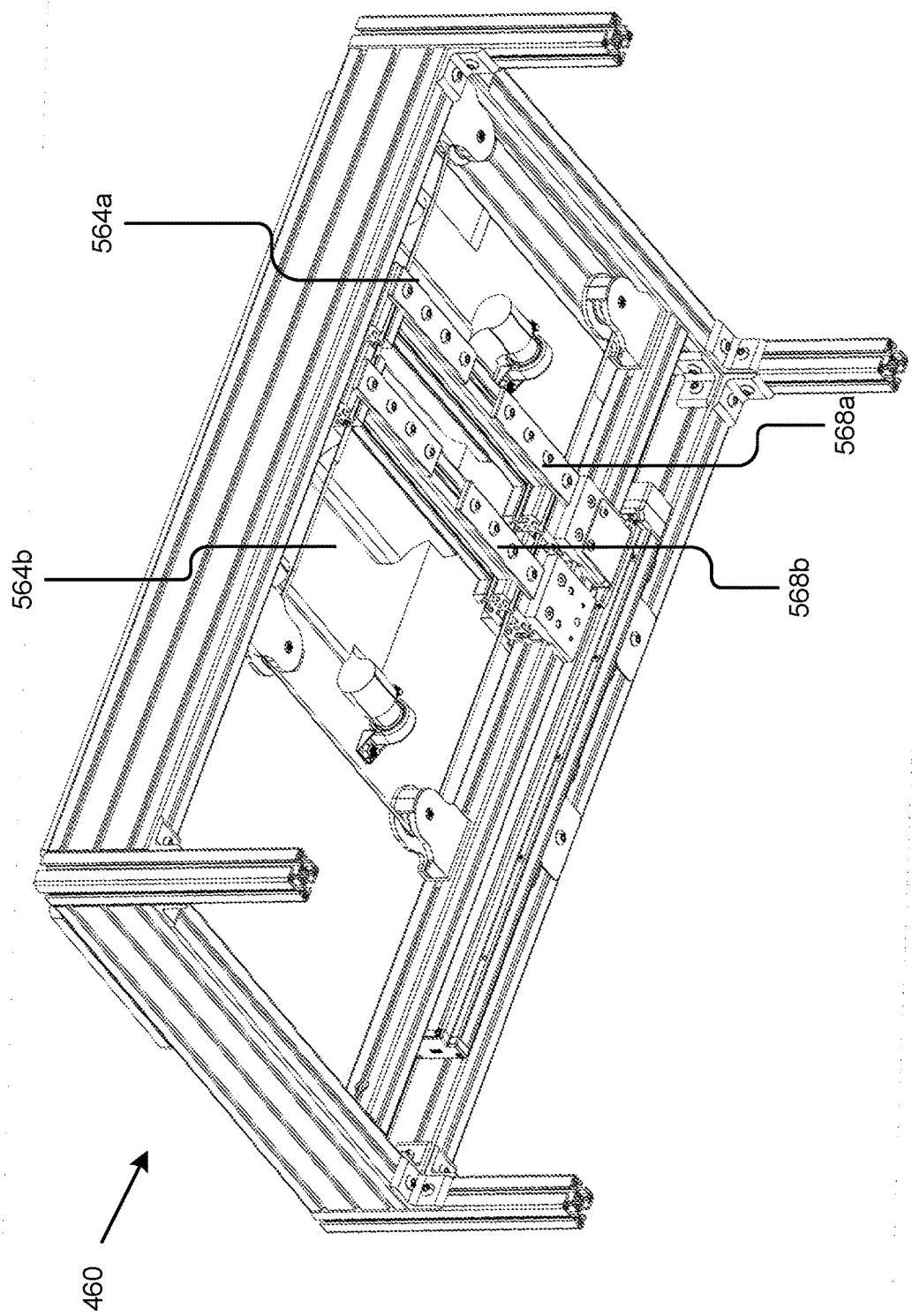
Figure 5C:
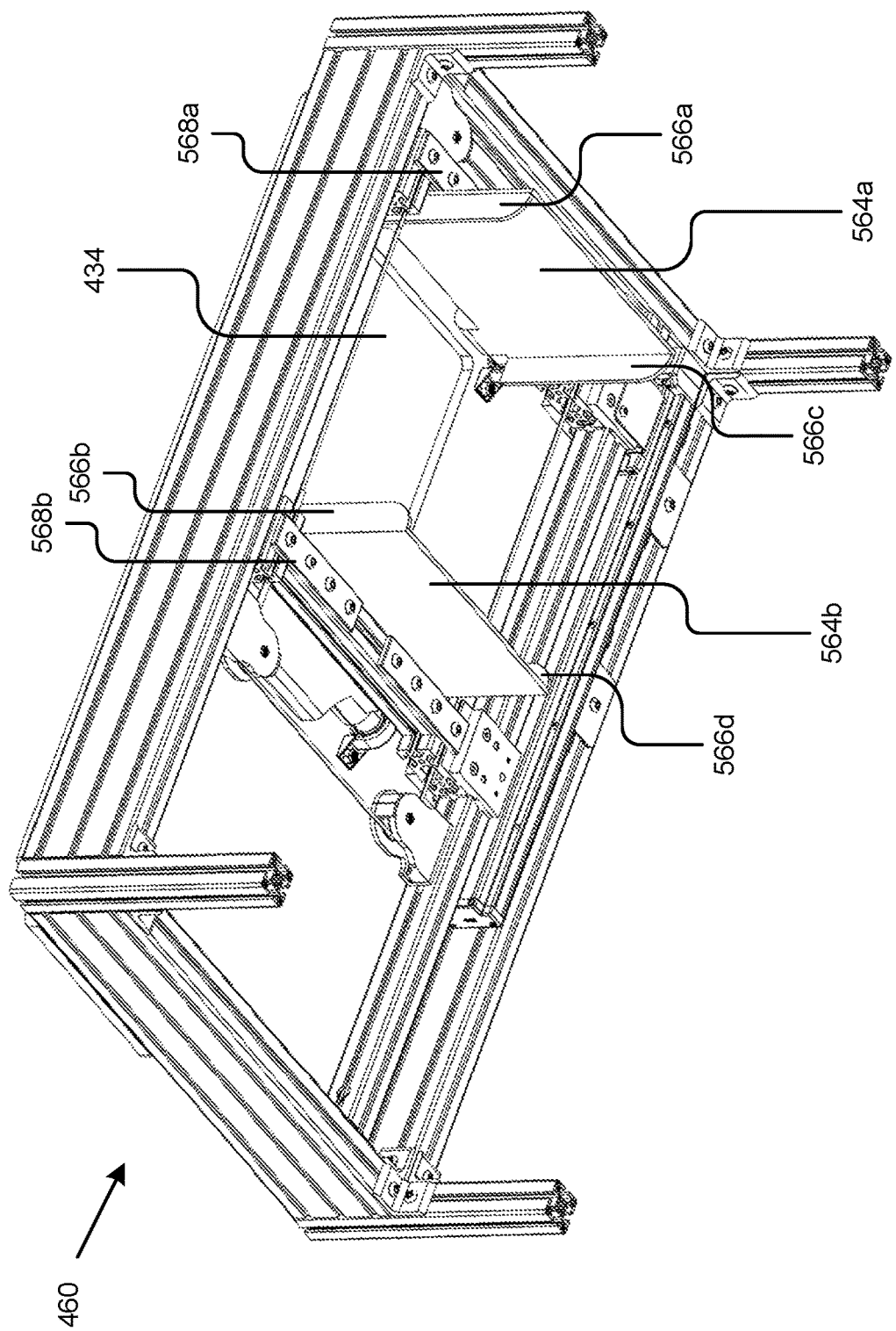
FIG. 5C illustrates an example transfer-station table of an example transfer station in an open position.

FIGS. 5A, 5B, and 5C illustrate an example transfer-station table 460, which may be a component of the transfer station 150, although it may be used separately or in a different configuration. For instance, for visibility, the chute 428, chute walls 430, part of the frame 424, and carton-receiving area 422 have been removed to illustrate example mechanisms of the transfer-station table 460. The transfer-station table 460 may house and/or support various mechanisms and components for transferring items between the item-consolidation area 426 and a carton-receiving area 422, as described in further detail below.

FIG. 5A illustrates a top-perspective view of the transfer-station table 460 with a top surface 562 (which may be a floor of the consolidation area 426) where the opening, aperture, or passage 434 is closed by a door member 564, which may include a trap door where two door members 564a and 564b open outward from a center seam, as illustrated in FIG. 5C. For example, a top surface of the door members 564a and 564b may support items in the consolidation area 426 when the door members 564 are closed. It should be noted that while two door members 564 are illustrated, a single door member 564, three or more door members 564, or another mechanism may be used. In the illustrated example, two door members 564a and 564b are illustrated opening at a center point, which reduces the force exerted on a single door when items rest thereon and when the door is opening and closing. Additionally, the example of two door members 564a and 564b pivoting from the center reduces the likelihood of the door member(s) 564 from contacting a carton or item in the carton-receiving area 422 (e.g., because they do not extend as far downward when opened as a single pivoting door).

As illustrated, the top surface 562 may extend to a frame and provide support to the door members 564 and/or actuating mechanisms (e.g., 602 described below) that open and/or close the door member(s) 564 or provide other functionality.

FIG. 5B illustrates a bottom-perspective view of the transfer-station table 460 with a door member 564 in a closed position, and FIG. 5C illustrates a bottom-perspective view of the transfer-station table 460 with the door members 564 in an open position. For example, a transfer station 150 may include one or more door members 564 closing the opening/passage 434, which may be located between the consolidation area 426 and the carton-receiving area 422. The one or more door members 564 may be opened or closed using an actuating mechanism, such as one or more linear actuators, motors, pullies, cables, cams, and/or other devices. For instance, a linear actuator may retain the door members 564 in a closed position when one or more items are in the consolidation area 426 and open or allow to open the chute 428 door in response to a signal from the WES 102 and/or equipment controller(s) 110.

In some implementations, the transfer station 150 may include one or more guides for guiding items into a consolidation area 426 (e.g., the chute 428) and/or from the consolidation area 426 into a carton. A transfer station 150 may include a guide member 566 adapted to guide the item into the carton when it is transferred from the consolidation area 426, for example, when a door member 564 is an open position. For example, FIGS. 5A and 5C show example guide members 566a, 566b, 566c, and 566d, which may be side walls that open with the door members 564a and 564b, although additional, fewer, or different guide members 566 may be used. For example, a guide member 566 may include a surface that, when coupled with a door member 564, forms a side wall that prevents items from falling sideways out of a carton when they pass through the opening 434. Additionally, the door member(s) 564 may also guide items into the carton and prevent them from falling outside of the carton.

In some implementations, the transfer-station table 460 may use linear motion to counter rotational motions of the door member(s) 564. For example, a linear actuator or mechanism for translation of motor rotation may pull the door member 564 open and/or push the door member 564 closed, or it may allow the door member 564 to fall open or spring closed, for example. Example mechanisms for opening and/or closing the door members 564 are described and illustrated in reference to FIGS. 6A-7.

In some implementations, the transfer-station table 460 may use a pair of door members 564a and 564b (e.g., opening from a center point, as illustrated in the example), which may reduce torque on a single door and decrease the probability that the single door may contact an item when closing. The transfer-station table 460 may also include bars 568a and 568b or other members that provide support to the door members 564a and 564b.

Figure 6A:
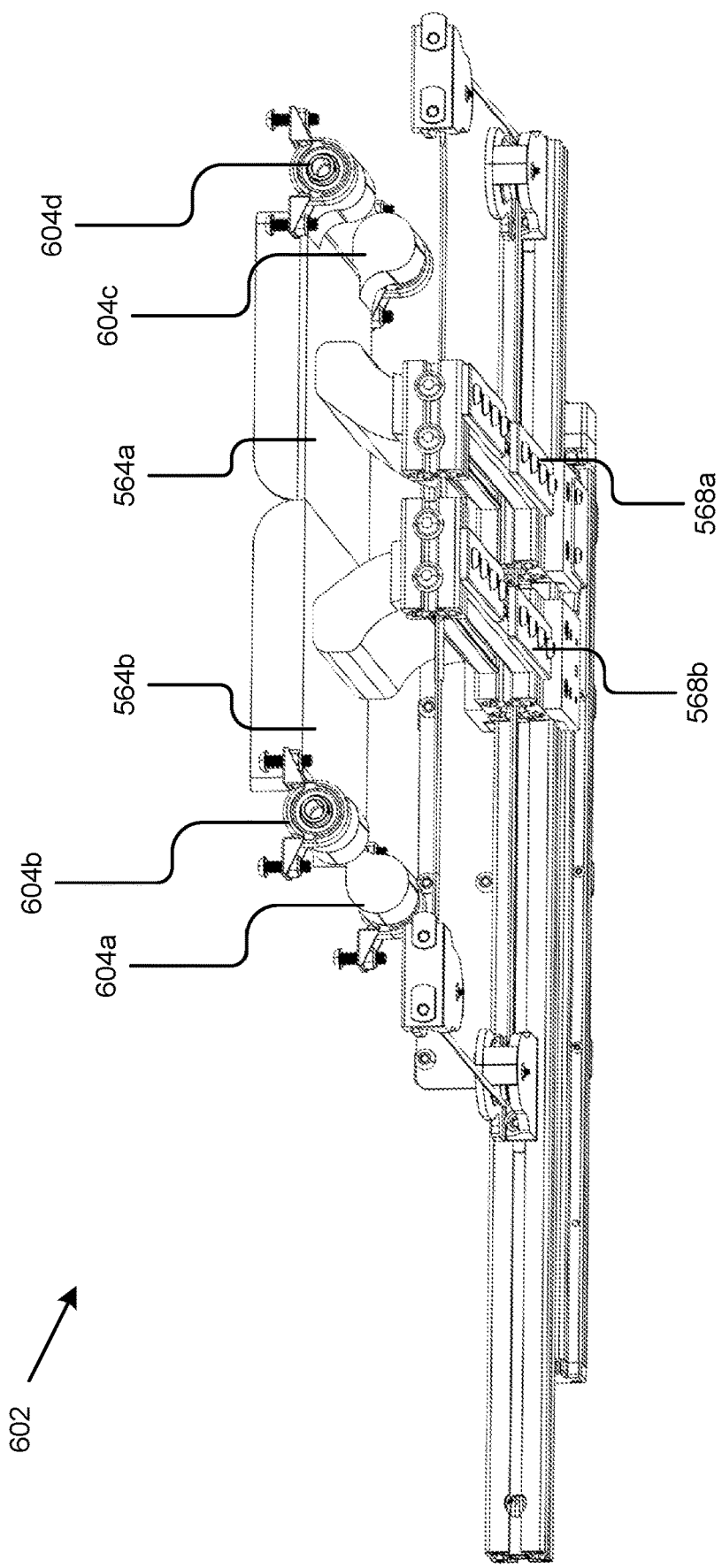
FIGS. 6A-6F illustrate various views of an example actuation mechanism of a transfer station.

FIG. 6A illustrates an example actuation mechanism 602, which may open or close a passage 434 of a transfer station 150 and transfer-station table 460. Although certain example mechanisms are described in reference to FIGS. 6A-6H, other implementations are possible for transferring items between the item-consolidation area 426 and a carton or carton-receiving area 422. For example, as illustrated in FIG. 5C above, the actuation mechanism 602 may be coupled with a transfer station 150, for example, to a transfer-station table 460.

For example, the transfer station 150 may use various mechanisms to open and/or close the door member(s) 564. In some implementations, the transfer-station table 460 may use one or more motors, which cause the door member(s) 564 to pivot and/or one or more actuatable devices (e.g., latches, bars 568, or other devices) that hold the door member(s) 564 closed when weight (e.g., due to items) is placed thereon. For example, the transfer-station table 460 may actuate (e.g., using a motor) a latch to allow a door member 564 to open due to the weight of an item or the pressure exerted by a motor. Once the item has dropped through the opening 434, the spring or the motor may close the door member(s) 564 and/or close the latch.

In some implementations, the bars 568a and 568b may slide along rails, frames, or other structures. For instance, a motor may apply motive force to the bar(s) 568 along the rails and the bar(s) 568 may, in turn, apply force to the door member(s) 564. In some implementations, the motor(s) may be coupled directly with the door member(s) 564 to apply force thereto. Other mechanisms and features may also be used without departing from the scope of this disclosure.

For instance, the door member(s) 564 may be coupled with one or more hinges 604a, 604b, 604c, and 604d, which allow the door member(s) 564 to pivot open, thereby opening a passage 434 between the item-consolidation area 426 and carton/carton-receiving area 422. When the passage 434 is opened, items in the consolidation area 426 may fall through the passage 434 and into a carton in the carton-receiving area 422, for example, based on signals from the WES 102 or equipment controller 110. As illustrated, the hinges 604 may allow the door member(s) 564 to pivot downward toward a carton in the carton-receiving area 422, which door member(s) 564 may thereby provide a guide into the carton, as described above.

Figure 6B:
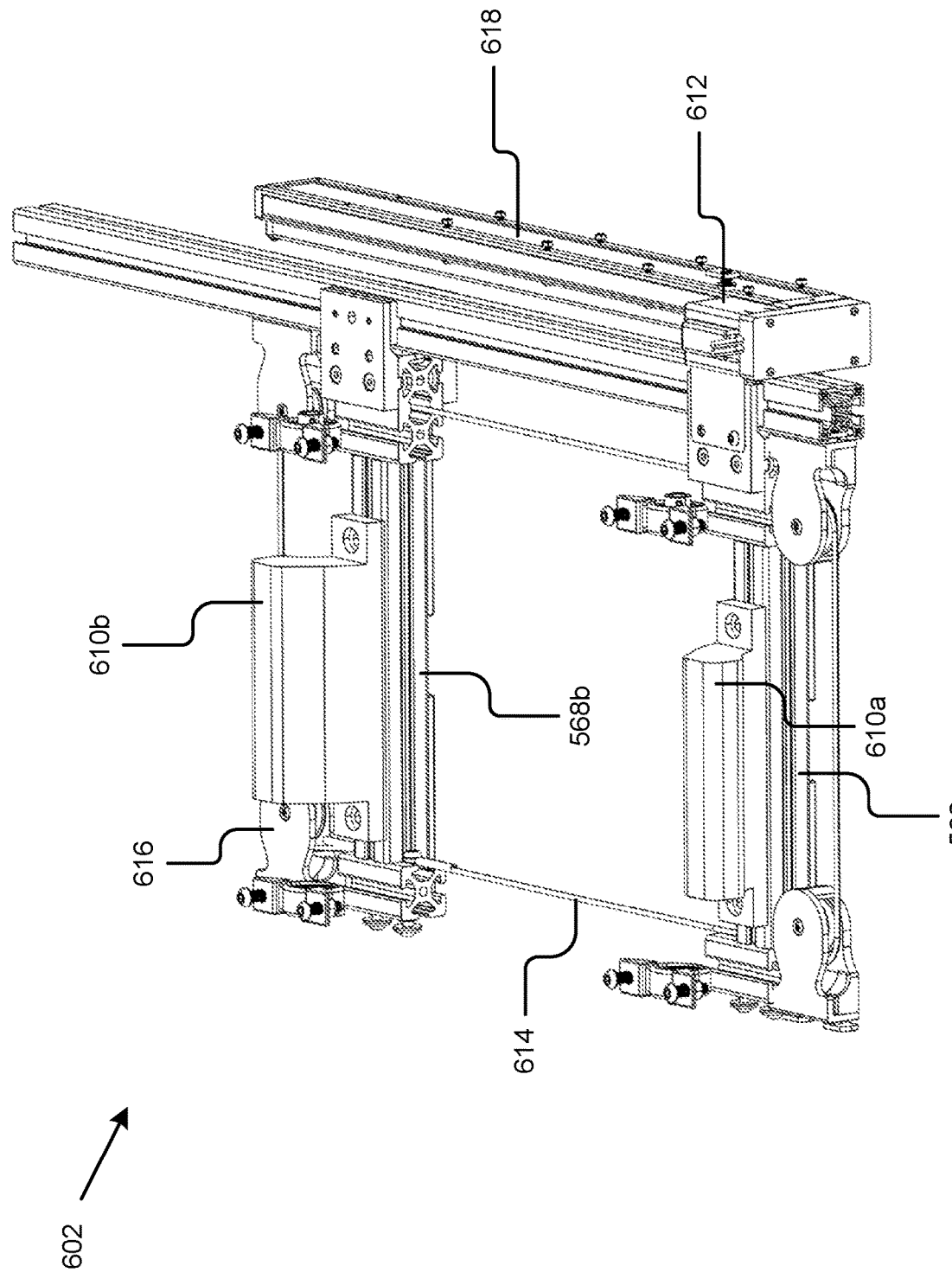

FIG. 6B illustrates an example actuation mechanism 602, which may be used to open or close door member(s) 564 (not illustrated in FIG. 6B). For instance, FIG. 6B illustrates two bars 568a and 568b, which are coupled with cams 610a and 610b, respectively. The cam(s) 610 may contact the door member 564(s) thereby providing vertical support, changing points of contact (e.g., for varying torque), and smooth movement, among other benefits. The cam(s) 610 are described in further detail below, for example, in reference to FIGS. 6C, 6D, and 6H.

In some implementations, the actuation mechanism 602 may include motors 612, such as stepper motors, linear actuators, pulleys, and/or other devices to move the bar(s) 568 and/or door members 564. For example, the WES 102 may signal (either directly or via the equipment controller(s) 110) a linear actuator or other motor to move one or both of the bars 568a and 568b or other structures, which, in turn, move (or allow to move) one or both of the door members 564a and 568b. For example, as described below, the door member(s) 564, bar(s) 568, cam(s) 610, or other components may slide along one or more rails, as noted below.

In some implementations, the actuation mechanism 602 may include or be coupled with one or more sensors (e.g., either directly or via the WES or equipment controller(s) 110). For instance, an optical (e.g., camera, beam-break sensor, etc.), pressure (e.g., weight), contact, or other sensors. For instance, a sensor may identify position of door member(s) 564, position of motors, position of bar(s) 568, etc. In some implementations, a sensor may detect items in a consolidation area 426, items in a passage 434, a carton in the carton-receiving area 422, an item in the carton, or other states.

For example, a WES 102 or equipment controller 110 may receive a signal from the sensor to determine when to actuate the actuation mechanism, detect an error, or completion of a task, for example, as described elsewhere herein.

In some implementations, the bars 568 and/or motors 612 may be linked by cords, cables 614, chains, gears, drive shafts, belts, and/or pullies 616, for instance, which cause the two bars 568a and 568b to move together. For instance, the motor 612 may apply a force to the cable(s) 614 via a pully 616 or other mechanism, which causes the bar(s) 568 to translate horizontally, as illustrated. In some implementations, the pullies 616 and cables 614 may couple the bar(s) 568 to one or more linear actuators (e.g., motor 612), which pull the cable(s) 614, thereby pulling the bar(s) 568 closed and/or open.

Additionally or alternatively, the linear actuator(s) may be directly coupled with one or both of the bars 568. For example, a linear actuator may be coupled with a first bar 568a (e.g., directly or via other structures) to move the first bar 568a and with a first cable 614 that pulls the second bar 568b open via a pair of pullies 616. Similarly, the linear actuator may be coupled to the same or a second cable 614, which pulls the second bar 568b closed, depending on the implementation. For instance, a pair of pullies 616 (e.g., using a first cable 614) at a first end of the actuation mechanism 602 adjacent to a first bar 568a may pull a first cable 616 to close the second bar 568b, and a pair of pullies 616 (e.g., using a second cable 614) at a second end of the actuation mechanism adjacent to a second bar 568b may pull the second bar 568b open when the first bar 568 is closed and opened, respectively. In some instances, the cable(s) 614 may pass through the bar(s) 568 (e.g., as illustrated in the example), rail 618, frame, or other components of the actuation mechanism or transfer station 150 to allow the movement of the door members 564 to be linked (e.g., to move in opposite directions). Accordingly, a single linear actuator may slide along one or more rails 618 or frames to open or close both bars 568, thereby reducing complexity and cost.

Similarly, other motors or actuation mechanisms may be used to open/close the bar(s) 568 or door member(s) 564. It should be noted that although bars 568, cables 614, pullies 616, linear actuator/motor 612, and other structures are illustrated, other mechanisms for opening and/or closing the door members 564(s) may be used and are contemplated herein, such as motors 612 directly coupled with the door member(s) 564 (e.g., hinges 604), rotational motors coupled with pullies 616, doors that slide sideways (e.g., instead of rotating) with the bar(s) 568, or other implementations are possible and contemplated herein.

Figure 6C:
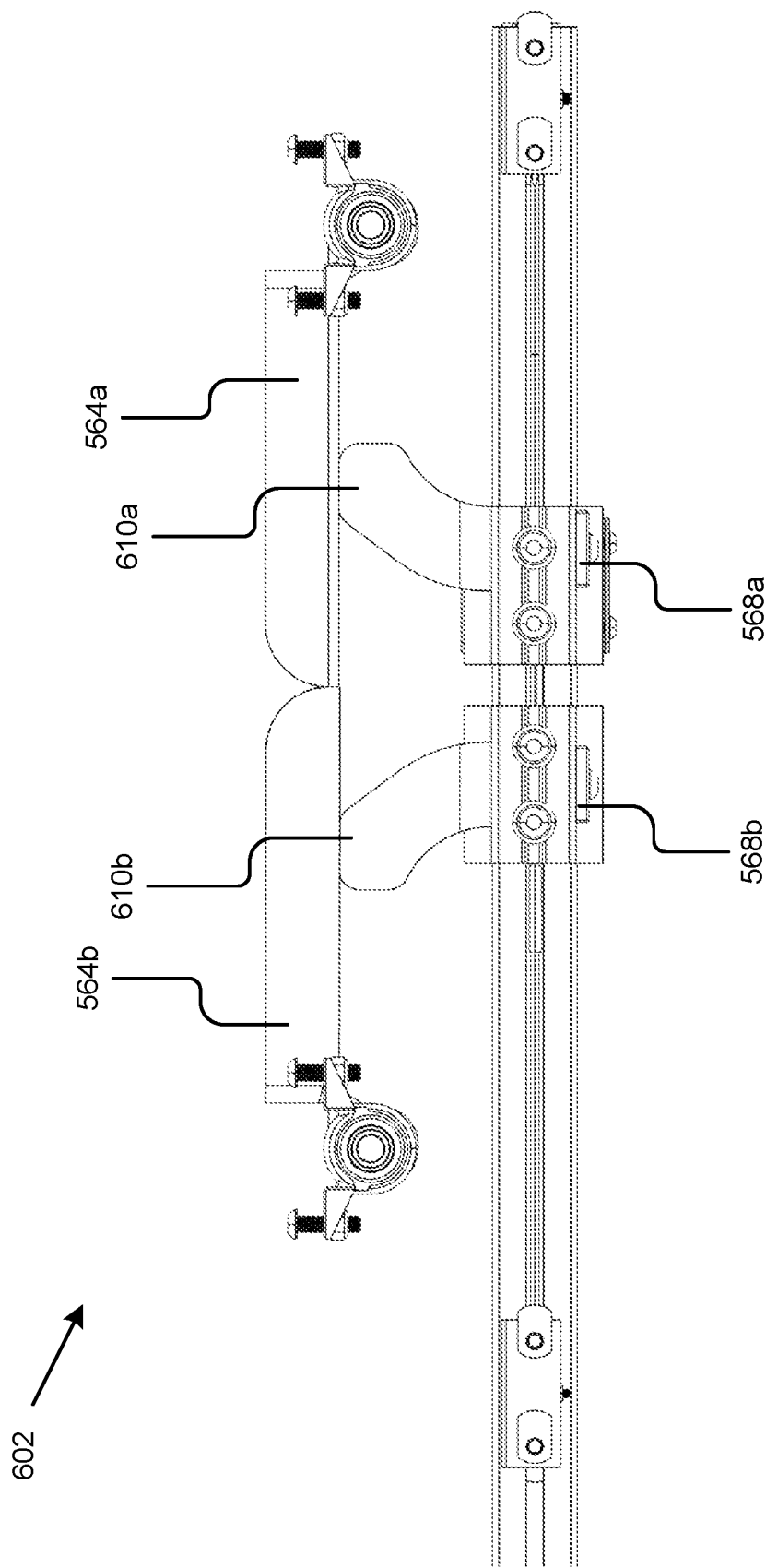
Figure 6D:
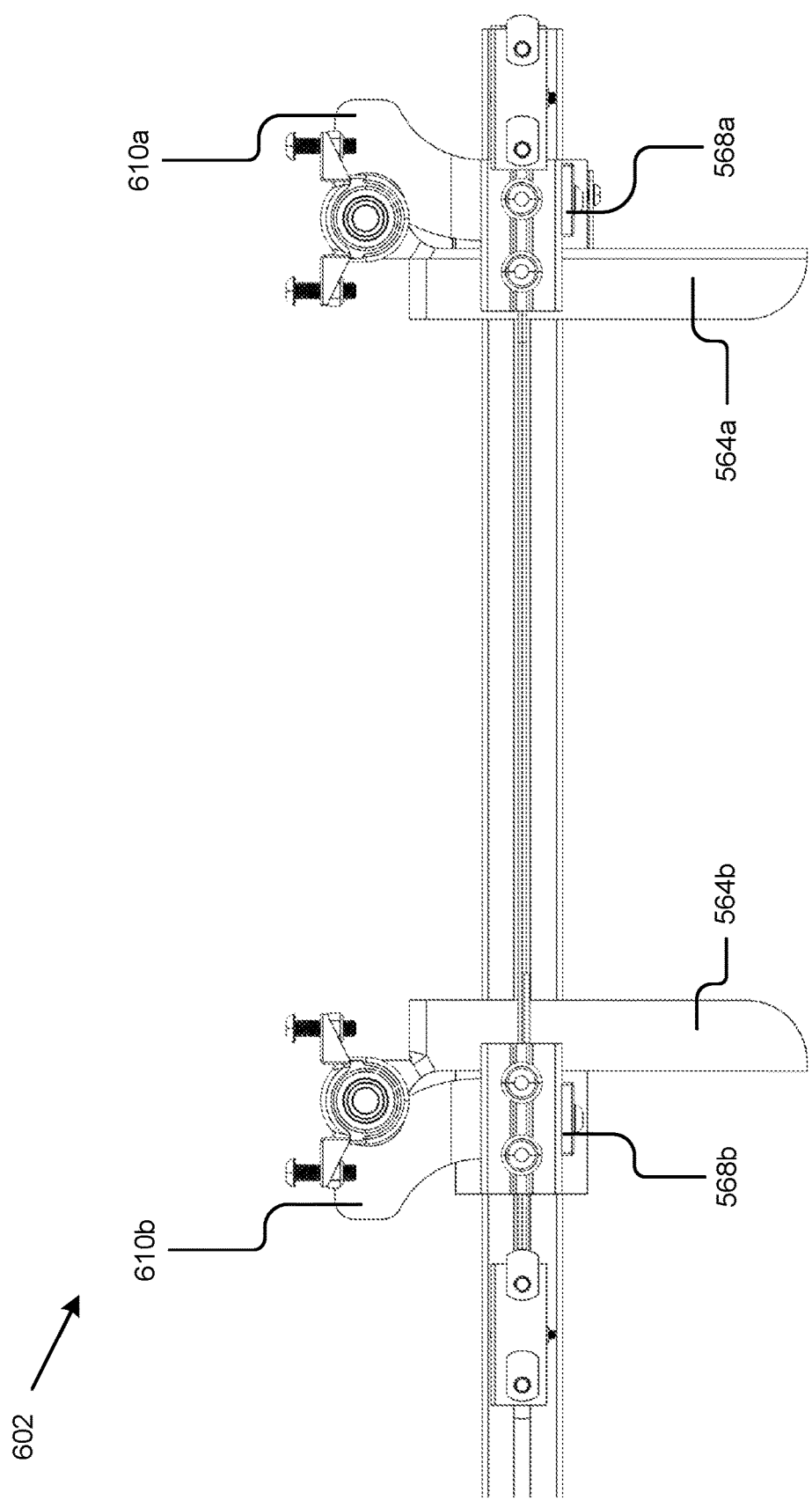

FIG. 6C illustrates a side view of an example actuator mechanism 602 in a closed configuration with the bars 568a and 568b slid together, thereby closing or holding the door members 564a and 564b closed (e.g., to close a passage 434 of a transfer-station table 460). FIG. 6D illustrates a side view of the example actuator mechanism 602 in an open configuration with the bars 568a and 568b slid apart, thereby opening or allowing the door members 564a and 564b to open (e.g., to open the passage 434 of the transfer-station table 460).

In the illustrated example of FIG. 6C the bars 568a and 568b are illustrated pushed towards each other, thereby supporting the door members 564a and 564b. In the illustrated example of FIG. 6D, the bars 568a and 568b have been moved apart to allow or cause the door members 564a and 564b to open.

For example, the WES 102 or equipment controller(s) 110 may send a signal to an actuator mechanism (e.g., a motor 612 or controller thereof) of the transfer station 150 to translate the bar(s) 568 (e.g., perpendicularly to their longitudinal axis, as illustrated) thereby removing vertical support for the door member(s) 564 and/or providing a force pulling the door member(s) 564 into an open position. Similarly, when the items have been dropped (e.g., based on actuation of the actuation mechanism, a sensor reading, or another trigger), after a defined time period, or responsive to another condition, the actuation mechanism 602 may move the bar(s) 568 back under the door member(s) 564 thereby providing vertical support. The doors 564 may be closed using springs, motors, movement of the bar(s) 568, and/or other mechanisms.

In some implementations, the bars 568a and 568b may be coupled to or include one or more cams 610a and 610b that contact the door member(s) 564a and 564b, respectively, to push the door members 564 open or allow them to smoothly close. For instance, a cam 610 may be a curved component that decreases friction and/or torque on the door member(s) 564 at various points of movement. Additionally or alternatively, a cam 610 may be coupled with a motor or other actuator to open or close the door member(s) 564. An example cam 610 is illustrated and described elsewhere herein, for example, in reference to FIG. 6H.

Figure 6E:
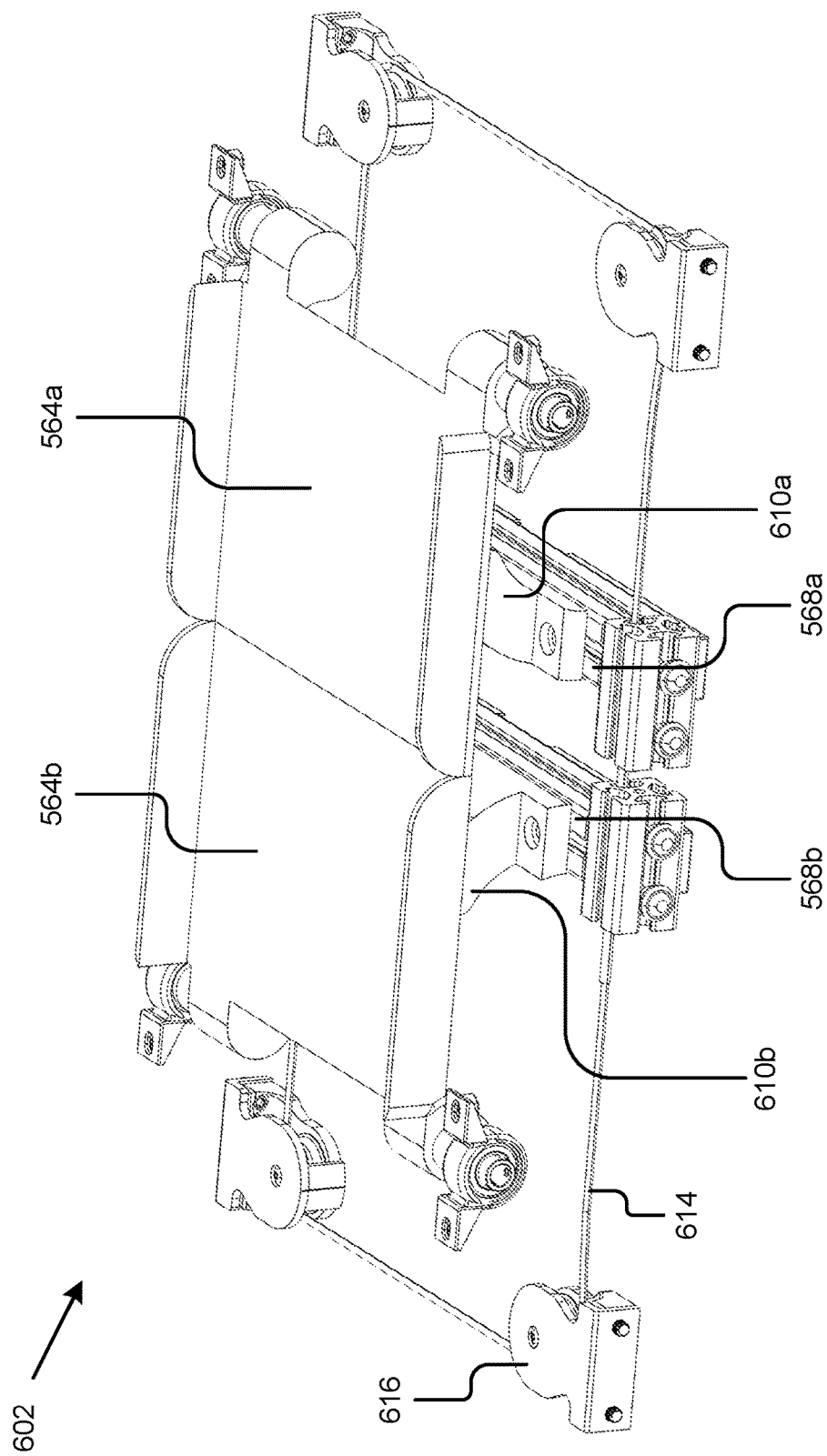
Figure 6F:
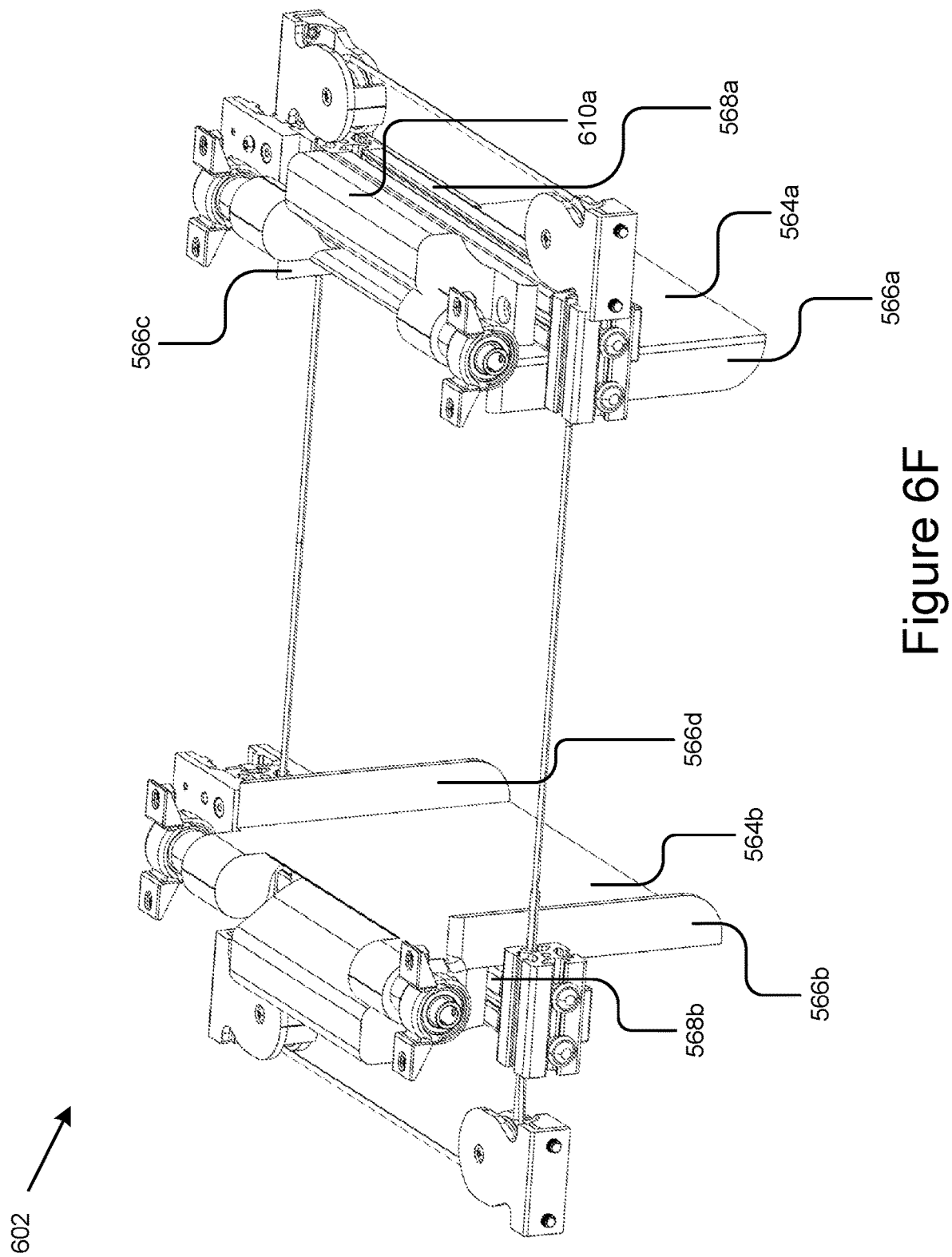

FIGS. 6E and 6F illustrate a top-perspective view of an example actuation mechanism and door members 564 in a closed position and an open position, respectively. The illustrated example of FIGS. 6E and 6F may correspond to another view of the example of FIGS. 6C and 6D.

As illustrated in the example of FIG. 6E, the door members 564a and 564b may rest on or attach to cams 610a and 610b, respectively. Similarly, cams 610a and 610b may be coupled with supports/bars 568a and 568b. The bars 568, door members 564, or cams 610 may be coupled with one or more cables 614, pullies 616, or motors 612 (not illustrated in FIG. 6E), which, responsive to a signal from the WES 102 or equipment controller 110, opens or closes the door member(s) 564. For instance, FIG. 6F illustrates the bars 568a and 568b slid away from each other and, correspondingly, the cams 610a and 610b slid apart from each other. Based on weight of items on top of the door member(s) 564, a spring (e.g., in a hinge 604), a motor, an attachment to a cam 610 or bar 568, or another mechanism, the door member(s) 564 may be drawn open.

In some implementations, as illustrated in FIG. 6F, the door members 564a and 564b may pivot downward and away from each other, so that the surface of the door members 564, along with the guide members 566 allow the item(s) to fall into a carton while preventing the item(s) from moving horizontally to fall outside of the carton. For instance, a first door member 564a may have raised side walls or guide members 566a and 566c, and a second door member 564b may have guide members 566b and 566d. The guide members 566 along with the door members 564 may fall inside the edges of a carton in the carton-receiving area 422 (e.g., either below or above a top edge of an open carton) thereby guiding items from the item-consolidation area 426 into a carton in the carton-receiving area 422. For instance, as illustrated in reference to FIG. 4A an aperture/passage 434 may be located at a corner or defined location of the carton-receiving area 422 and a carton 432 may be positioned (e.g., by moving the carton against one or more walls, guides, stopping areas, sensors, etc.) below the passage 434, so that when the door members 564 open, the door members 564 and guide members 566 prevent objects from falling sideways out of the carton 432.

Figure 6G:
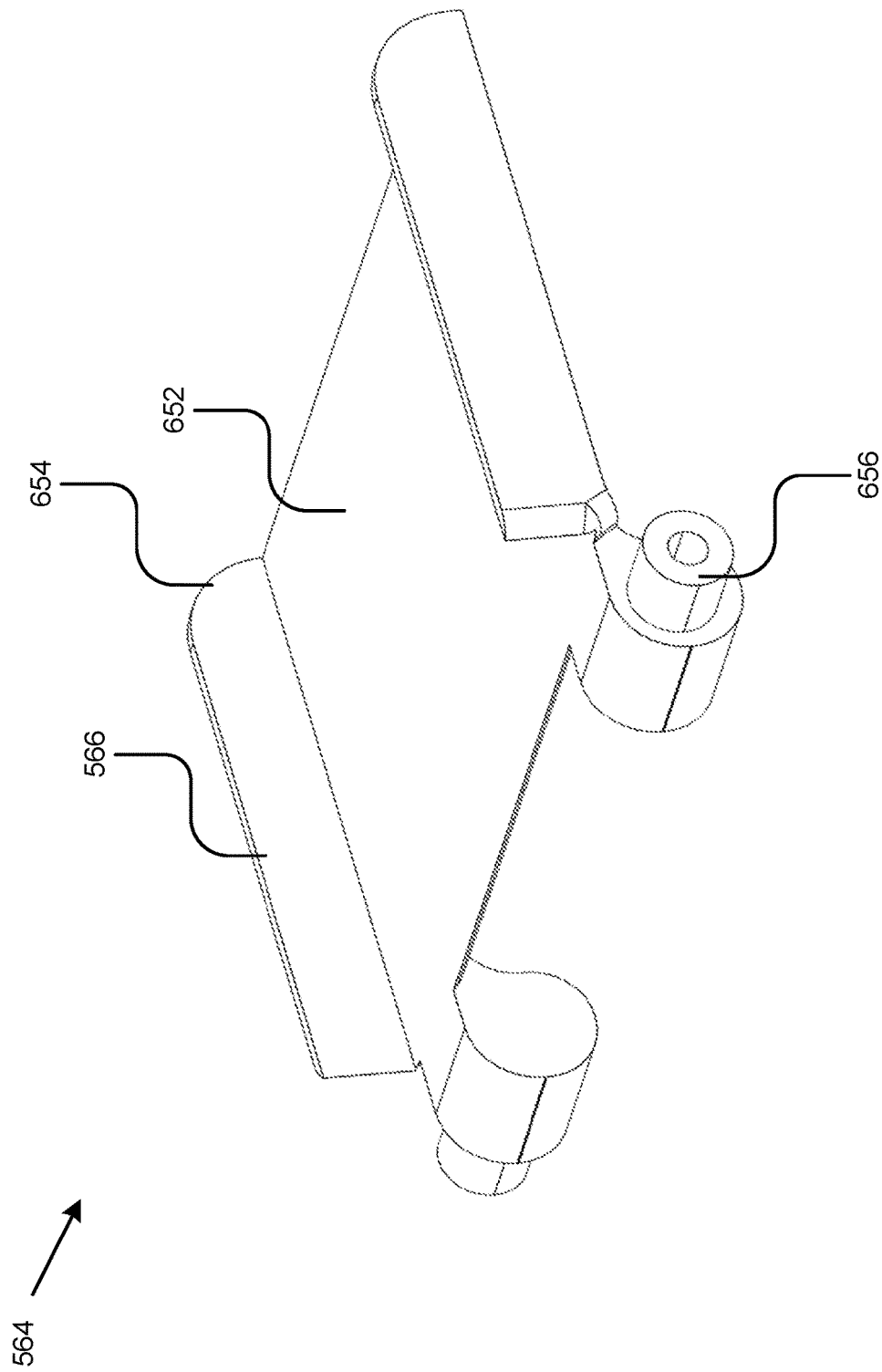
FIG. 6G illustrates an example door member for closing a passage of a transfer station.

FIG. 6G illustrates an example door member 564. In the illustrated example, the door member 564 may include a surface 652 that faces upwards toward the item-consolidation area 426 when the door member 564 is closed. The surface 652 may be flat, include rollers, be rounded, or have other structures, which may allow items to slide down the surface 652 and/or be guided into a carton in the carton-receiving area 422. In some implementations, the surface 652 may extend or have a length that closes a passage 434 whether alone or with other door members 564.

In some implementations, the door member 564 may include one or more guide members 566, which may be side walls or raised edges (e.g., at 45- or 90-degree angle to the surface 652). A guide member 566 may have a rounded end 654, which may allow the guide member 566 to avoid contacting another guide member 566 on a second door member 564 when the door members 564 pivot apart from each other into an open position, as described above.

In some implementations, the door member 564 may include (e.g., have integrated or coupled thereto) one or more hinge points 656, which may couple with hinge(s) 604, motors, or other components. It should be noted that although the door member(s) 564 are illustrated herein as pivoting downward, in some implementations, they may slide or pivot horizontally to open the passage 434. Similarly, it should be noted that the transfer station 150 may include zero, one, two, or more door members 564, which may have different configurations to the illustrated example. For instance, items may fall through the passage 434/a chute 428 without being held back by a door member 564, door members 564 may have different shapes or positions, etc. In other implementations, other mechanisms (e.g., a robotic arm, mechanisms located above the door member 564, etc.) may be used to transfer items from the item-consolidation area 426 to a carton in a carton-receiving area 422.

Figure 6H:
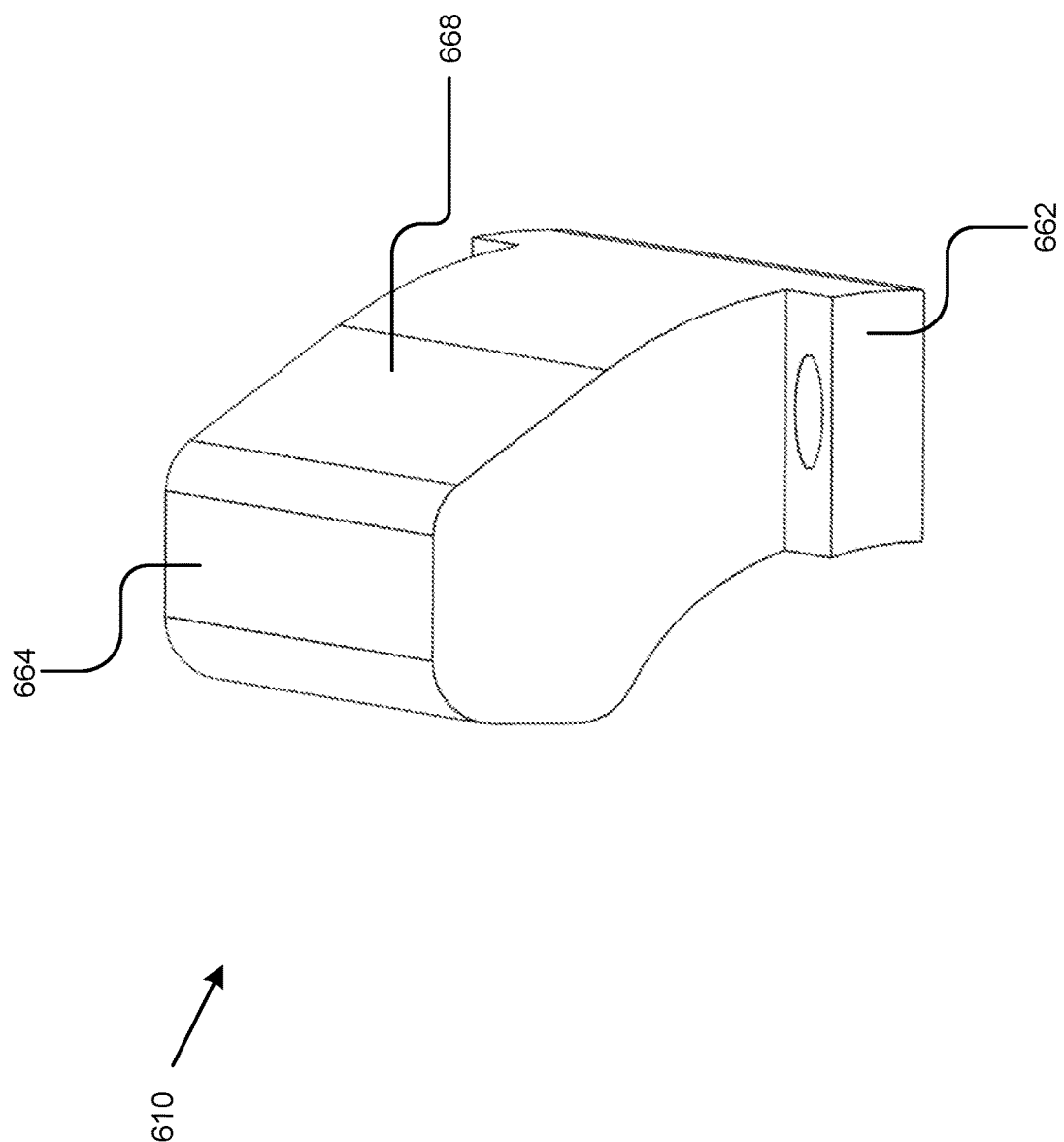
FIG. 6H illustrates an example cam for an actuation mechanism.

FIG. 6H illustrates an example cam mechanism 610, which may provide support for a door member 564 and/or provide force to the door member 564 to push/pull it open and/or closed.

As illustrated, the cam 610 may include a mounting point 662 that attaches to (e.g., using bolts or other fasteners), is connected with, or is integrated with the bar 568, as described above.

Depending on the implementation, the cam 610 may include a top surface 664, which may be flat, have a roller, gears, or other features that may contact a bottom surface of a door member 564. In some instances, the top surface 664 may have a smooth or slick surface or may include rollers to decrease friction when contacting the bottom of the door member 564.

In some implementations, the cam 610 may include a contoured side 668 that defines a motion of a door member 564 between an open and closed position. For example, as the cam 610 moves sideways, the contoured side 668 may define a contact point along the door member 564 (e.g., a bottom surface thereof). For example, the contoured side 668 may contact (e.g., at a point near the mounting point 662) a door member 546 nearer to an end point (e.g., distal from a hinge point 656) when the door member 564 is open. Accordingly, as the cam 610 moves, the support and torque can be dynamically adjusted to design requirements (e.g., speed, item weight) based on the profile of the contoured side 668.

Depending on the implementation, other mechanisms than a cam 610 may be used. For instance, a bar 568 may directly contact the door member 564, a hinged structure may couple the bar 568 to the door member 564 (e.g., an elongated body hingeably connected at each end to the bar 568 and door member 564), or other mechanisms may be used.

Figure 7:
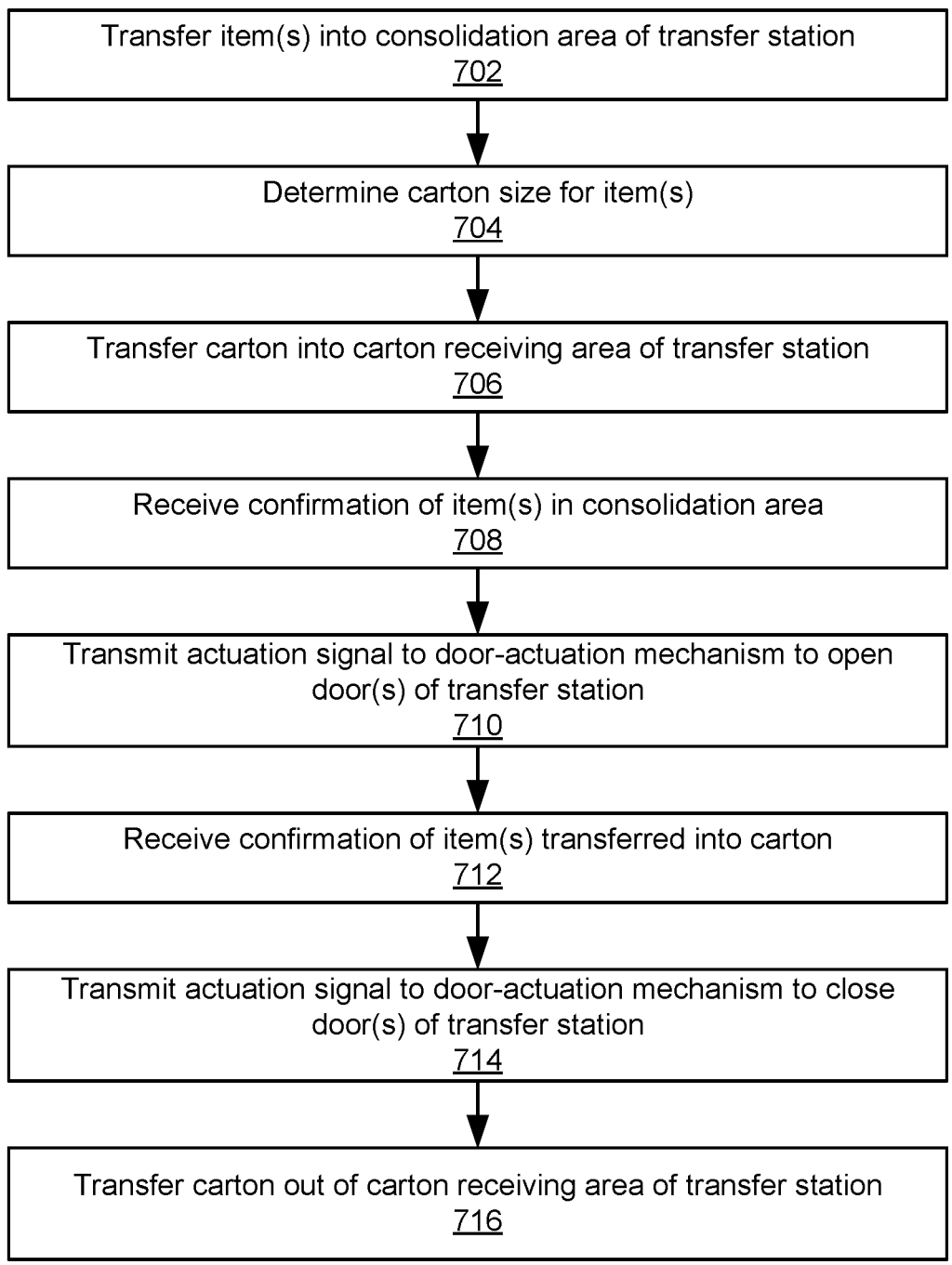
FIG. 7 is a flowchart of an example method for packaging items into a carton using a transfer station.

FIG. 7 is a block diagram illustrating an example method for transferring items between an item-consolidation area 426 and a carton-receiving area 422. For instance, the method may be used to move items from a first conveyor belt into a carton, which may be moved using a second conveyor belt, AGV, or human picker. The operations of the method are described as being performed by an equipment controller 110, which may be a programmable logic controller, but it should be noted that the transfer station 150 and associated features may be directly or indirectly controlled by other systems, such as the WES 102, a separate logic controller, or a human picker manually actuating the actuation mechanism, for example.

At 702, the equipment controller 110 may transfer item(s) into a consolidation area 426 of a transfer station 150. For example, the equipment controller 110 may convey the items using an AGV 114 or item conveyor belt 146 to the item-consolidation area 426. In some implementations, a diverter mechanism may divert an item from a conveyor belt into the consolidation area 426. In some implementations, a human interface system 108 may issue an instruction to a human picker to place an item into the item-consolidation area 426. Depending on the implementation, the equipment controller 110 may cause or allow multiple items to be consolidated in the consolidation area 426 (e.g., by closing a passage 434). For example, if a carton is not yet in the item-consolidation area 426 or based on another defined condition, although items may be transferred individually.

At 704, the equipment controller 110 may determine a carton size for the item(s). For example, the equipment controller 110 (or another device in communication with the equipment controller 110) may determine a size, configuration, timing, shipping label, material, availability, or other detail of the carton for one or more items (e.g., multiple items for an order containing multiple items). For instance, a carton of appropriate size to fit an item may be selected based on data in a computer-accessible database, as noted above, defining dimensions or a volume of the item(s) and/or carton(s).

At 706, the equipment controller 110 may transfer the carton into the carton-receiving area 422 of the transfer station 150. In some implementations, the carton may be constructed by a carton erector and/or placed on a conveyor belt that conveys the carton to transfer station 150. For instance, a diverter mechanism, specialized belt, pneumatic pusher, or other device may push the carton into the carton-receiving area 422. As shown and described above, a carton-receiving area 422 may include one or more walls and rollers that cause the carton to move to a corner or other point in the carton-receiving area 422, so that various sizes or shapes of cartons may consistently be positioned below the passage 434 and/or door member(s) 564. For instance, rollers, diverters, or other mechanisms in the carton-receiving area 422 may push a carton toward a back corner or other location of the carton-receiving area 422 where they are stopped by one or more walls, sensors (e.g., triggering the rollers to stop moving), or otherwise positioned.

Depending on the implementation, the carton-receiving area 422 may be below a transfer station 150 consolidation area 426 of a transfer station 150, as described above. For example, the carton conveyor(s) 144, transfer station 150, or other mechanisms, may align the carton to an edge under a door and/or chute 428 guide of a consolidation area 426. The guide may include an opening or passage closed by a door in a transfer-station table 460/consolidation area 426, an exit of a chute 428, or walls/guides 566 of transfer station door(s) (e.g., 564), as described in further detail above. For example, the carton may be aligned to an edge or hard stop of a carton-receiving area 422 under a trap door through which items may pass.

It should be noted that although a carton conveyor 144 is described elsewhere herein, other methods of transferring cartons into the carton-receiving area 422 may be used. For example, an AGV 114, human agent (e.g., instructed by a human interface system 108), or other device may place a carton in the carton-receiving area 422.

At 708, the equipment controller 110 may receive a confirmation of the item(s) being in the item-consolidation area 426. For instance, the confirmation may a signal from or based on a sensor sensing items in the item-consolidation area 426, such as a pressure sensor, optical sensor, camera, etc., as described above. In some implementations, the confirmation may be a scan or button selection by a human agent, for example, via the human interface system 108. In some implementations, the confirmation may be based on the item having been delivered to the item-consolidation area 426 by an item conveyor or AGV, etc.

In some implementations, the equipment controller 110 may track, based on one or more confirmation messages, that one or multiple items are in the item-consolidation area 426. For instance, the equipment controller 110 may determine whether some or all of the items in an order are in the item-consolidation area 426, such as on a chute 428, in a passage 434, resting on a door member(s) 564, or otherwise.

At 710, the equipment controller 110 may transmit an actuation signal to a door-actuation mechanism 602 (e.g., to a motor 612, controller, etc., thereof) to open the passage 434 (e.g., by opening the door member(s) 564) of the transfer station 150 or otherwise transfer the item(s) from the consolidation area 426 to a carton in the carton-receiving area 422. For example, based on a signal from a sensor, an instruction by a control system (e.g., WES 102), an instruction by a user (e.g., via the human interface system 108), the equipment controller 110 may send a signal to a motor 612, such as a linear actuator, to open the door member(s) 564, as described in further detail above.

In instances where the carton arrives at the transfer station 150 before one or more items of the associated order, the carton may wait at the transfer station 150 for one or more items to be transferred into the carton, for example, one at a time, in a group, or all together after being consolidated in the consolidation area 426 of the transfer station 150. For example, the door member(s) 564 of the transfer station 150 may open, thereby allowing the item(s) of the order to fall into the carton. In some instances, the carton conveyor(s) 144 may move more quickly than one or more item conveyor(s) 146, so that a carton may arrive at an assigned transfer station 150 sooner than an item arrives at the assigned transfer station 150.

Alternatively, multiple items may arrive and be consolidated in the consolidation area 426 prior to the carton arriving in the carton-receiving area 422, so that the items may be held by the actuation mechanism 602 until the carton is ready/arrived to receive the items. Accordingly, the system allows flexible coordination of timing of arrival of the items and/or cartons.

In some implementations, the equipment controller 110 may actuate the door-actuation mechanism 602 based on other conditions, such as presence of all items of an order in the item-consolidation area 426, presence of a carton in the carton-receiving area 422, error signals, or other conditions.

It should be noted that other implementations are possible and contemplated herein, for instance, the door-actuation mechanism 602 may have a manual handle, switch, or override that allows a user to manually open the door member(s) 564 based on an instruction from the WES 102 (e.g., via the human interface system 108) or in case of a jam or error in the transfer station 150.

At 712, the equipment controller 110 may receive a confirmation that the item(s) are transferred into a carton in the carton-receiving area 422. The confirmation may be based on the door member(s) 564 successfully opening, an item-consolidation area 426 being empty (e.g., based on a sensor, as discussed above), a carton or carton-receiving area 422 experiencing increased weight, or another confirmation.

At 714, the equipment controller 110 may transmit an actuation signal to the door-actuation mechanism to close the passage 434, for example, by closing the door member(s) 564 and/or closing the bar(s) 568. In some instances, the door member(s) 564 may spring closed and the bar(s) 568 may instruct a motor to actuate the bar(s) 568, which provides vertical support to the door member(s) 564.

In some implementations, the equipment controller 110 detect an error, such as an item blocking the door member(s) 564 from closing, an item being stuck in the passage 434, an item remaining in the item-consolidation area 426 after opening the actuation mechanism 602, or another error. For instance, the equipment controller 110 may be coupled with one or more sensors, as described above, that detect an error in the transfer, for example, based on failure of the door member(s) 564 to close, an item sensed, etc. The equipment controller 110 may transmit a message to a human agent via the human interface system 108 (e.g., by each communicating with the WES 102) or directly issuing an output (e.g., sounding an alarm via a speaker, turning on a light, etc.) indicating the error. For example, the human interface system 108 may issue an instruction to a human agent identifying the error and transfer station 150, so that the human agent can manually address the error, such as by opening a chute wall 430, which may be clear and hinged to allow detection of and/or access to address the error.

At 716, the equipment controller 110 may transfer the carton out of the carton-receiving area 422 of the transfer station 150. For instance, based on the item(s) being successfully transferred into the carton, the equipment controller 110 may actuate a diverter, pneumatic pusher, conveyor, roller wheels, or other mechanism to move the carton out of the carton-receiving area 422. For instance, the equipment controller 110 may rotate rollers that push the carton out of the carton-receiving area 422 onto a carton conveyor 144, which transports the carton to an end point, such as a finalization station where the carton may be shipped to an end user.

Depending on the implementation, the carton conveyor 144 may be the same or a different carton conveyor 144 that brought the carton to the transfer station 150. For example, based on a position of cartons on a carton conveyor 144, the equipment controller(s) 110 may identify an empty space next to the transfer station 150 that is large enough for the carton, the equipment controller(s) 110 may transfer the carton onto the carton conveyor 144, as described above. In some instances, the equipment controller(s) 110 may stop the carton conveyor 144 and/or cartons on the carton conveyor 144 when transferring the carton onto the carton conveyor 144 to allow an additional carton to be moved onto the carton conveyor 144. In some implementations, a conveyor, motorized rollers, a mechanical arm, a pneumatic pusher, diverter mechanism 450, or other device may transfer the carton to/from the carton conveyor 144, as discussed above.

It should be noted that other means for removing the carton from the carton-receiving area 422 may be used, such as instructing an AGV 114 or human agent to retrieve the carton from the carton-receiving area 422.

In some implementations, the equipment controller 110 may determine that the carton, item(s), and/or errors have been removed from the transfer station 150 and, based on the determination, send a message to the WES 102 resetting the transfer station 150, so that the WES 102 can assign a new order to the transfer station 150.

It should be noted that various operations and features may be used interchangeably, although not all are described in each figure. Furthermore, it should also be noted that the operations and features are provided as examples and that other operations are features may be used without departing from the scope of this disclosure.

Figure 8:
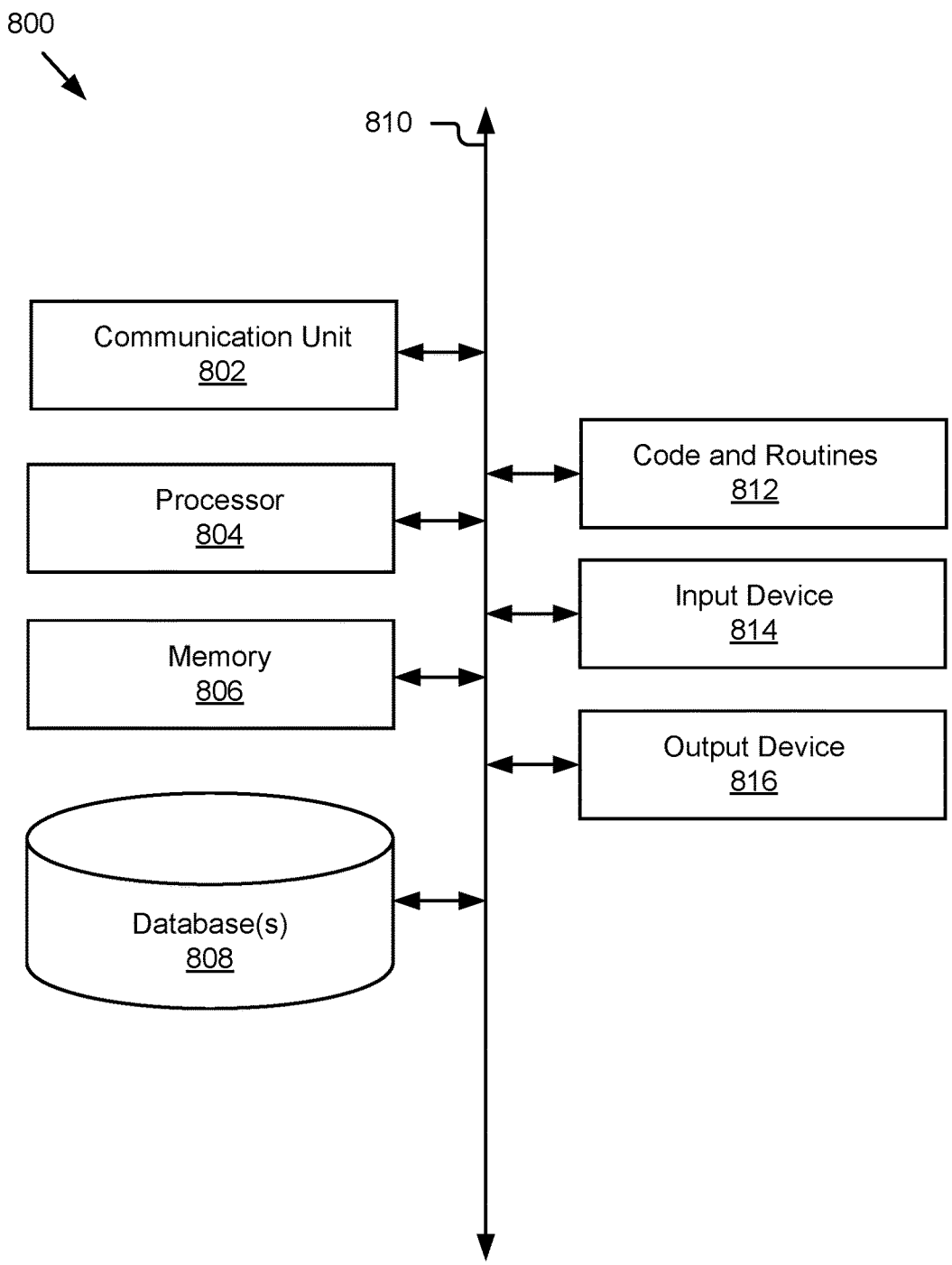
FIG. 8 is a block diagram illustrating an example computing system.

FIG. 8 is a block diagram illustrating an example computing system 800. The example computing system 800 may correspond to a WES 102, a WMS 104, a dispatch system 106, a human interface system 108, equipment controller(s) 110, REX 118, a client device, or other component of the system 100, for example.

The code and routines 812 may include computer logic executable by the processor 804 on a computing system 800 to provide for the functionality described in reference to one or more of the components of the system 100. For instance, in some implementations, the code and routines may include one or more of the components of the WES 102 or equipment controller(s) 110.

As depicted, the computing system 800 may include a processor 804, a memory 806, a communication unit 802, an output device 816, an input device 814, and database(s) 808, which may be communicatively coupled by a communication bus 810. The computing system 800 depicted in FIG. 8 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 800 may include various operating systems, sensors, additional processors, and other physical configurations. Although, for purposes of clarity, FIG. 8 only shows a single processor 804, memory 806, communication unit 802, etc., it should be understood that the computing system 800 may include a plurality of one or more of these components.

The processor 804 may execute software instructions by performing various input, logical, and/or mathematical operations. The processor 804 may have various computing architectures to process data signals including, for example, a complex instruction set computer (CISC) architecture, a reduced instruction set computer (RISC) architecture, and/or an architecture implementing a combination of instruction sets. The processor 804 may be physical and/or virtual, and may include a single core or plurality of processing units and/or cores. In some implementations, the processor 804 may be capable of generating and providing electronic display signals to a display device, supporting the display of images, capturing and transmitting images, performing complex tasks including various types of feature extraction and sampling, etc. In some implementations, the processor 804 may be coupled to the memory 806 via the bus 810 to access data and instructions therefrom and store data therein. The bus 810 may couple the processor 804 to the other components of the computing system 800 including, for example, the memory 806, the communication unit 802, the input device 814, the output device 816, and the database(s) 808.

The memory 806 may store and provide access to data to the other components of the computing system 800. The memory 806 may be included in a single computing device or a plurality of computing devices. In some implementations, the memory 806 may store instructions and/or data that may be executed by the processor 804. For example, the memory 806 may store the code and routines 812. The memory 806 is also capable of storing other instructions and data, including, for example, an operating system, hardware drivers, other software applications, databases, etc. The memory 806 may be coupled to the bus 810 for communication with the processor 804 and the other components of computing system 800.

The memory 806 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 804. In some implementations, the memory 806 may include one or more of volatile memory and non-volatile memory (e.g., RAM, ROM, hard disk, optical disk, etc.). It should be understood that the memory 806 may be a single device or may include multiple types of devices and configurations.

The bus 810 can include a communication bus for transferring data between components of a computing device or between computing devices, a network bus system including a network or portions thereof, a processor mesh, a combination thereof, etc. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 802 may include one or more interface devices (I/F) for wired and wireless connectivity among the components of the system 100. For instance, the communication unit 802 may include various types known connectivity and interface options. The communication unit 802 may be coupled to the other components of the computing system 800 via the bus 810. The communication unit 802 may be electronically communicatively coupled to a network (e.g., wiredly, wirelessly, etc.). In some implementations, the communication unit 802 can link the processor 804 to a network, which may in turn be coupled to other processing systems. The communication unit 802 can provide other connections to a network and to other entities of the system 100 800 using various standard communication protocols.

The input device 814 may include any device for inputting information into the computing system 800. In some implementations, the input device 814 may include one or more peripheral devices. For example, the input device 814 may include a keyboard, a pointing device, microphone, an image/video capture device (e.g., camera), a touch-screen display integrated with the output device 816, etc.

The output device 816 may be any device capable of outputting information from the computing system 800. The output device 816 may include one or more of a display (LCD, OLED, etc.), a printer, a 3D printer, a haptic device, audio reproduction device, touch-screen display, etc. In some implementations, the output device is a display which may display electronic images and data output by the computing system 800 for presentation to a user, such as a picker or associate in the order fulfillment center. In some implementations, the computing system 800 may include a graphics adapter (not shown) for rendering and outputting the images and data for presentation on output device 816. The graphics adapter (not shown) may be a separate processing device including a separate processor and memory (not shown) or may be integrated with the processor 804 and memory 806.

The database(s) are information source(s) for storing and providing access to data. The data stored by the database(s) 808 may be organized and queried using various criteria including any type of data stored by them, such as the data in the data store 120 and other data discussed herein. The database(s) 808 may include file systems, data tables, documents, databases, or other organized collections of data. Examples of the types of data stored by the database(s) 808 may include the data described herein, for example, in reference to the data store 120.

The database(s) 808 may be included in the computing system 800 or in another computing system and/or storage system distinct from but coupled to or accessible by the computing system 800. The database(s) 808 can include one or more non-transitory computer-readable mediums for storing the data. In some implementations, the database(s) 808 may be incorporated with the memory 806 or may be distinct therefrom. In some implementations, the database(s) 808 may store data associated with a database management system (DBMS) operable on the computing system 800. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

It should be noted that the components described herein may be further delineated or changed without departing from the techniques described herein. For example, the processes described throughout this disclosure may be performed by fewer, additional, or different components.

It should be understood that the methods described herein are provided by way of example, and that variations and combinations of these methods, as well as other methods, are contemplated. For example, in some implementations, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies, and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A system, comprising:
   an item-consolidation area that receives one or more items;
   a carton-receiving area that receives a carton;
   a structure that holds the item-consolidation area vertically higher than the carton-receiving area;
   a passage between the item-consolidation area and the carton-receiving area, the passage allowing the one or more items to pass from the item-consolidation area to the carton in the carton-receiving area, the system including one or more door members pivoting to close the passage and pivoting to open the passage; and
   an actuation mechanism that controls movement of the one or more items between the item-consolidation area and the carton-receiving area, the actuation mechanism including a support member that provides vertical support to the one or more door members via one or more contact points coupled with the support member when the one or more door members are in a closed position, the support member translating horizontally, the one or more contact points contacting varying points of the one or more door members at varying angles of the one or more door members as the support member translates horizontally.

2. The system of claim 1, wherein:
   the item-consolidation area includes one or more walls that prevent the one or more items from falling horizontally out of the item-consolidation area;
   the passage is located at a bottom of the item-consolidation area; and
   the structure includes a frame that holds the item-consolidation area vertically above the carton-receiving area so that gravity causes the one or more items to fall through the passage and into the carton in the carton-receiving area.

3. The system of claim 1, further comprising:
   a chute including one or more sloped surfaces that guide the one or more items toward the passage in the item-consolidation area.

4. The system of claim 3, wherein:
   the passage is offset from a center of the item-consolidation area toward a corner of the item-consolidation area; and
   the carton-receiving area includes a guide positioning the carton at a location of the carton-receiving area that is offset from a center of the carton-receiving area toward a corner of the carton-receiving area, the corner of the carton-receiving area corresponding to the corner of the item-consolidation area.

5. The system of claim 1, wherein:
   the passage includes an aperture in a floor item-consolidation area, the aperture providing an opening between the item-consolidation area and the carton-receiving area.

6. The system of claim 1, wherein the actuation mechanism includes:
   two or more door members closing the passage when in the closed position and opening the passage when in an open position.

7. The system of claim 6, wherein:
   the two or more door members pivot downward toward the carton-receiving area when in the open position, the two or more door members pivoting away from each other when in the open position.

8. The system of claim 7, wherein each of the two or more door members include:

a side wall adapted to guide the one or more items into the carton in the carton-receiving area when the two or more door members are in the open position and the one or more items are moving between the item-consolidation area and the carton in the carton-receiving area.

9. The system of claim 1, wherein the actuation mechanism includes:
a motor connected to the one or more door members to open or close the one or more door members responsive to a signal from a processor.

10. The system of claim 9, wherein the support member includes:
one or more bars that provide the vertical support to the one or more door members when in the closed position, the one or more bars moving to remove the vertical support from the one or more door members when in an open position.

11. The system of claim 10, wherein:
the one or more bars extend beyond two or more sides of the one or more door members when the one or more door members are in the closed position, the one or more bars translating in a direction perpendicular to a length of the one or more bars when transitioning between the open position and the closed position.

12. The system of claim 10, wherein:
the one or more door members include a first door member and a second door member;
the one or more bars include a first bar and a second bar, the first bar providing support to the first door member when in the closed position, the second bar providing support to the second door member when in the closed position; and
one or more cables linking movement of the first bar with movement of the second bar.

13. The system of claim 12, wherein the actuation mechanism includes:
one or more pullies coupled with the one or more cables and configured to move the second bar away from the first bar when the motor moves the first bar into the open position.

14. The system of claim 10, wherein:
the one or more bars are coupled with one or more cams to provide the vertical support to the one or more door members when in the closed position, the one or more contact points being disposed along a surface of the one or more cams, the one or more cams contacting the one or more door members at varying points of the one or more cams when the one or more cams move between the closed position and the open position, the support member including the one or more bars, the one or more cams sliding horizontally with the support member.

15. The system of claim 1, wherein the actuation mechanism includes:
the one or more door members closing the passage when in the closed position and opening the passage when in an open position, the one or more door members pivoting downward toward the carton-receiving area when opening to the open position; and
a cam including a contoured side that contacts the one or more door members at varying points as the one or more door members pivot between the open position and the closed position, the cam providing support to keep the one or more door members in the closed position, the cam being coupled to a top surface of the support member and moving horizontally with the support member.

16. The system of claim 1, further comprising:
a first conveyor belt positioned adjacent to the item-consolidation area, the first conveyor belt transporting the one or more items to the item-consolidation area; and
a second conveyor belt positioned adjacent to the carton-receiving area, the carton-receiving area transporting the carton to the carton-receiving area.

17. A computer-implemented method comprising:
transferring one or more items into an item-consolidation area of a transfer station;
transmitting, by one or more processors, a first actuation signal to an actuation mechanism of the transfer station to actuate into an open position, the actuation mechanism controlling movement of the one or more items from the item-consolidation area to a carton-receiving area of the transfer station including pivoting one or more doors at a passage between the item-consolidation area and the carton-receiving area to the open position, the carton-receiving area holding a carton, the open position allowing the one or more items to move from the item-consolidation area to the carton-receiving area, pivoting the one or more doors to the open position including translating a support member horizontally, the support member providing vertical support to the one or more doors via one or more contact points coupled with the support member when the one or more doors are in a closed position, the one or more contact points contacting varying points of the one or more doors at varying angles of the one or more doors as the support member translates horizontally;
receiving, by the one or more processors, a confirmation message indicating that the one or more items have been transferred from the item-consolidation area to the carton-receiving area; and
transmitting, by the one or more processors, a second actuation signal to the actuation mechanism to actuate into the closed position.

18. The computer-implemented method of claim 17, further comprising:
determining, by the one or more processors, a carton size for the carton;
transferring the carton having the determined carton size into the carton-receiving area of the transfer station; and
based on the confirmation message indicating that the one or more items have been transferred from the item-consolidation area to the carton-receiving area, transferring the carton out of the carton-receiving area of the transfer station.

19. A system, comprising:
means for receiving one or more items;
means for receiving a carton;
means for transferring the one or more items from the means for receiving the one or more items into the carton including:
one or more door members at a passage between the means for receiving the one or more items and the means for receiving the carton, the one or more door members pivoting to close the passage and pivoting to open the passage, and
an actuation mechanism including a support member that provides vertical support to the one or more door members via one or more contact points coupled with the support member when the one or more door members are in a closed position, the support member translating horizontally, the one or more contact points contacting varying points of the one or more door members at varying angles of the one or more door members as the support member translates horizontally; and means for transmitting a first actuation signal to the means for transferring the one or more items, the first actuation signal causing the one or more items to be transferred from the means for receiving the one or more items into the carton.

20. The system of claim 19, further comprising:

means for transmitting a second actuation signal to the means for transferring the one or more items, the second actuation signal causing the means for transferring to move into the closed position, the closed position preventing movement of the one or more items into the carton from the means for receiving the one or more items.

* * * * *